United States Patent [19]

O'Sullivan et al.

[11] Patent Number: 5,929,538

[45] Date of Patent: Jul. 27, 1999

[54] MULTIMODE POWER PROCESSOR

[75] Inventors: George A. O'Sullivan, Pottersville, N.J.; Joseph A. O'Sullivan, St. Louis, Mo.

[73] Assignee: Abacus Controls Inc., Somerville, N.J.

[21] Appl. No.: 08/884,306

[22] Filed: Jun. 27, 1997

[51] Int. Cl.$^6$ ........................................................ H02J 7/00
[52] U.S. Cl. .............................. 307/66; 307/64; 307/44; 364/528.21
[58] Field of Search .................................. 307/43, 44, 45, 307/46, 47, 48, 49, 50, 51, 64, 65, 66, 85, 86, 87; 364/480, 492, 493, 528.21, 528.22, 528.23, 528.3, 528.32

[56] References Cited

U.S. PATENT DOCUMENTS

| | | | |
|---|---|---|---|
| 4,277,692 | 7/1981 | Small | 3067/66 |
| 4,287,465 | 9/1981 | Godard et al. . | |
| 4,528,457 | 7/1985 | Keefe et al. . | |
| 4,652,770 | 3/1987 | Kumano . | |
| 4,731,547 | 3/1988 | Alenduff et al. | 307/85 |
| 4,761,563 | 8/1988 | Ross et al. . | |
| 4,775,800 | 10/1988 | Wood . | |
| 5,010,469 | 4/1991 | Bobry . | |
| 5,057,697 | 10/1991 | Hammond et al. . | |
| 5,070,251 | 12/1991 | Rodes et al. . | |
| 5,126,585 | 6/1992 | Boys . | |
| 5,168,436 | 12/1992 | Barlage . | |
| 5,184,025 | 2/1993 | McCurry et al. . | |
| 5,198,698 | 3/1993 | Paul et al. . | |
| 5,198,970 | 3/1993 | Kawabata et al. . | |
| 5,229,651 | 7/1993 | Baxter, Jr. et al. . | |
| 5,241,217 | 8/1993 | Severinsky . | |
| 5,264,732 | 11/1993 | Fiorina et al. . | |
| 5,285,365 | 2/1994 | Yamato et al. . | |
| 5,289,045 | 2/1994 | Lavin et al. . | |
| 5,289,046 | 2/1994 | Gregorich et al. . | |
| 5,295,078 | 3/1994 | Stich et al. . | |
| 5,302,858 | 4/1994 | Folts . | |
| 5,332,927 | 7/1994 | Paul et al. . | |
| 5,384,792 | 1/1995 | Hirachi . | |
| 5,483,463 | 1/1996 | Qin et al. | 364/492 |
| 5,500,561 | 3/1996 | Wilhelm | 307/64 |
| 5,532,525 | 7/1996 | Kaiser . | |

OTHER PUBLICATIONS

Bower et al. (1990) IEEE AES Magazine, Aug., pp. 16–21.
O'Sullivan, G. (1988), PCIM Magazine, Dec. :42–6.
O'Sullivan, G. (1989), "Bimode UPS reduces systen complexity," European Power News, Nov./Dec., Hastings Printing Co. Ltd, East Sussex, England.
O'Sullivan, G. (1990), "The myth of On–Line UPS", Atlantic Tech., vol: 5, No: 10.
O'Sullivan, G. (1993), "Fault Tolerant Battery Power Recycling", Fourth Int. Conference, Sep. 7–Oct.1, Berlin, Germany, pp. 18–31.

*Primary Examiner*—Jeffrey Gaffin
*Assistant Examiner*—Jonathan S. Kaplan
*Attorney, Agent, or Firm*—Klauber & Jackson

[57] ABSTRACT

In one embodiment, a power processor which operates in three modes: an inverter mode wherein power is delivered from a battery to an AC power grid or load; a battery charger mode wherein the battery is charged by a generator; and a parallel mode wherein the generator supplies power to the AC power grid or load in parallel with the battery. In the parallel mode, the system adapts to arbitrary non-linear loads. The power processor may operate on a per-phase basis wherein the load may be synthetically transferred from one phase to another by way of a bumpless transfer which causes no interruption of power to the load when transferring energy sources. Voltage transients and frequency transients delivered to the load when switching between the generator and battery sources are minimized, thereby providing an uninterruptible power supply. The power processor may be used as part of a hybrid electrical power source system which may contain, in one embodiment, a photovoltaic array, diesel engine, and battery power sources.

35 Claims, 25 Drawing Sheets

FIG. 14A
SIMPLIFIED
BLOCK DIAGRAM
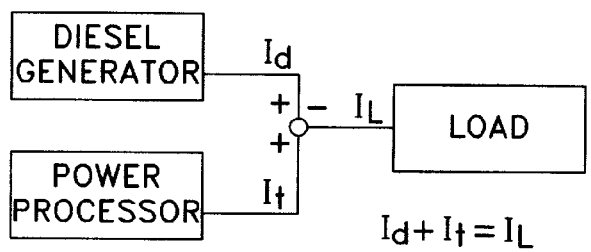
FIG. 14B
DIESEL GENERATOR
RATED CURRENT
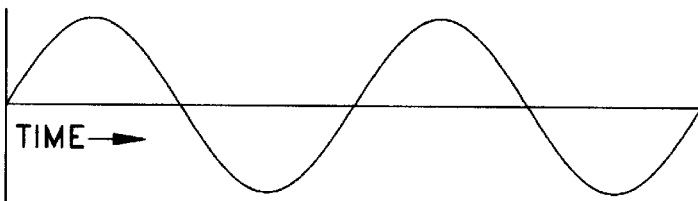
FIG. 14C
NONLINEAR
LOAD CURRENT
FIG. 14D
DIESEL GENERATOR
CURRENT 25% RATED
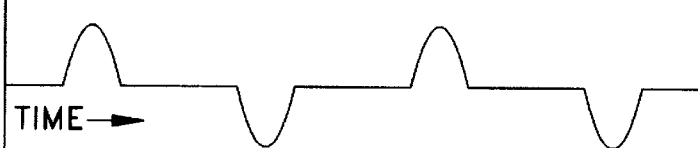
FIG. 14E
PROCESSOR CURRENT
LOAD MINUS
GENERATOR
FIG. 14F
DIESEL GENERATOR
AT RATED OUTPUT
FIG. 14G
PROCESSOR
CURRENT BATT CHGR

MULTIMODE POWER PROCESSOR

This invention was made with Government support under Contract No. DE-FG02-94ER81689 awarded by the Department of Energy. The Government has certain rights in this invention.

FIELD OF THE INVENTION

The present invention relates to electrical power processors generally, and more particularly, but not by way of limitation, to a novel power processor capable of operating in several modes.

BACKGROUND OF THE INVENTION

Conservatively, there may be over one hundred thousand localities in the world waiting for the benefits that electricity can provide, and many of these locations are in climates where sunshine is plentiful. Thus, hybrid systems, such as those involving diesel engine generators, batteries and renewable energy sources, may be advantageously utilized in such locales. Cost effective applications of hybrid systems include remote facility power, remote home and village power, and power for dedicated loads, such as communications. The hybrid system market is anticipated to be one of the most important growth opportunities for photovoltaic systems and electrical power processors capable of managing power flow. However, hybrid system design is driven by economics, electrical performance goals, and predetermined needs. Most frequently, a reduction in diesel fuel consumption and engine run time is an economical necessity in countries where oil importation is a critical drain on financial resources.

Various Uninterruptible Power Supply (UPS) systems have been developed in the past. A UPS may be utilized in hybrid systems such as those involving diesel engine generators, batteries and renewable energy sources.

The use of alternative power generation systems in remote applications is becoming increasingly important. However, in developed countries, the cost of extending the power grid to remote installations may be prohibitive, while in developing countries, a local power grid may not even exist. In military or remote temporary industrial sites, such alternative power generation systems may be the only option. In these situations, the use of power generators such as diesel-fuel powered generators is often a reasonable choice. The cost of operating such a system may be reduced by supplementing the system with a battery storage system and possibly another source such as by solar or wind power. The alternate source may thus be used to assist in charging the batteries, and the batteries may be used with an inverter in place of the diesel when the batteries are charged.

The inverters used in these applications typically function under two modes of operation. In the first mode, the battery is charged; in the second mode, energy is supplied from the battery to the load instead of from the diesel. During switching between the battery and the diesel, significant transients can occur in both the voltage and the frequency supplied to the load. These transients can negatively affect sensitive modern equipment which may comprise part of the load.

Most renewable energy conversion devices such as photovoltaic cells and wind generators depend upon an unpredictable availability of the source of energy, e.g. sunshine or winds. When the devices are implemented in energy systems, they typically produce unpredictable, unregulated AC or DC power with uncontrolled frequency or voltage levels. Small systems typically collect and store energy in a battery bank, then apply DC power directly to the loads as needed, and are operated as stand-alone systems. The battery bank provides the energy reservoir for the system when the loads, the storage and the collectors are properly sized. The DC loads, such as lighting, communications, pumping, or refrigeration are readily available for low-voltage systems. For small systems with proper sizing and noncritical loads, hybridization with diesel or similar engine generator systems is unnecessary for more remote applications because the renewable source, if sized properly, can economically supply all the power needed for the system.

For larger systems requiring AC loads, the complexity of the renewable system is increased because of the addition of an inverter. The addition of an engine-generator to construct a renewable hybrid energy system adds additional complexity.

Stand-alone inverters which are not utility-interactive have been developed and evaluated in renewable energy systems. Stand-alone inverter topology and performance vary with measured efficiencies, typically ranging from 60% to 93%. The voltage waveforms of the AC outputs are typically quasi-square wave, although a small number of sine wave inverters are also available which operate as stand-alone devices having efficiencies which range from 70% to 85%.

Small UPS inverter hardware, typically 1 to 3 kW, is also currently available. Such hardware is designed to supply power to critical loads in the event of utility outages or brownouts. UPS hardware is typically designed with good power-quality goals and short duration operation, but typically do not optimize efficiency or surge capabilities. These UPS inverters and stand-alone inverters are usable in systems or hybrid systems in which either the engine-generator using non-renewable fuel or the inverter position of the system is supplying AC power to the loads.

As used herein, the term "loads" includes, but is not limited to, motors, non-linear electronic loads, highly inductive ballasts for fluorescent or vapor-arc lighting, and/or resistive loads. The load surge currents may be as high as three times the normal operating currents. Inductive kicks and switching transients of at least two times the normal peak operating voltage may be produced by the loads. Typically the power factor of the load will be less than 0.9 and the system may include lumped power factor correction, filtering, or resonant-type voltage regulators for critical or sensitive loads. Some critical loads, such as computers, may use additional UPS components.

As used herein, the term "transfer switch" includes, but is not limited to, a switch which provides timed, synchronized transfer of the electrical power flow which is transferred from the engine-generator to the inverter source and vice-versa. The transfer switch is typically a break-before-make switch that operates when the source voltages are synchronized or are at a zero crossing of the current.

As used herein, the term "inverter" refers to a device which converts DC energy stored in a battery or batteries to regulated AC voltage and current. The inverter typically may generate either a quasi-square wave (QSW) voltage or a sinusoidal wave output voltage. Typically, the QSW inverter is adequate for most non-sensitive loads, but overall system performance and efficiency are generally higher with sine wave inverters. Typically, the inverter is sized to provide system load currents continuously and must be capable of supplying starting surges, providing and sinking the Volt-Ampere Reactive (VAR) requirements of the loads, and withstanding the switching transients produced by some loads. The inverter must also be compatible with the storage medium and should tolerate normal variations in supply voltages due to changes in battery state of charge and loading. The inverter should automatically self-protect in the event of overloads for extended periods of time. Typically, transient protection of the DC input terminals is desirable.

As used herein, the term "battery" or "storage battery" is used to generally refer to a storage medium or source of DC energy. Battery types include but are not limited to deep-discharge lead-acid batteries and nickel-cadmium batteries. Those skilled in the art of battery selection will recognize which battery technology is appropriate for a specific application.

Sources of DC energy other than batteries include fuel cells, with which the present invention has been successfully applied in testing, and high speed engine generators whose variable speed precludes frequency regulation and therefore includes a multiphase rectifier, an example being a portable lightweight gas turbine. For the fuel cell, applying DC to the fuel cell assembly, previously identified as the battery charger mode of application, can be used by those skilled in electrochemistry to generate fuel for storage and future use.

The battery is typically sized to maximize the effectiveness of the renewable energy source and an engine-generator in hybrid systems. The storage battery must be capable of supplying the load surge requirements while maintaining a reasonable operating voltage at the inverter inputs. The battery type and size typically determine thresholds, charging currents and times, and control algorithms for the system. The depth-of-discharge charge rates, and thresholds of a battery typically vary with type of plates, chemistry and/or construction.

As used herein, the term "controller" may refer to, but is not limited to, a single controller, such as in a hybrid system, which may comprise multiple functions or multiple controllers. Typical functions of a controller include: monitoring and maintaining the state of charge of the batteries; monitoring and providing proper on-off cycles for the engine-generator including adequate run times and warmup times; maximizing the utilization of the renewable energy source; and providing the control signals to the transfer switch, starting circuits, inverters, and possibly to the loads when load shedding is needed. The controller may contain rectifiers for converting the generator's AC power to DC for charging the storage batteries. The controller should also contain the control algorithms needed to maximize the use of the renewable energy source, maximize the lifetime of the storage battery, and optimize the performance of the engine-generator while minimizing its maintenance.

As used herein, the term "renewable energy source" may include, but is not limited to, photovoltaics, wind devices, hydro devices such as low-head turbines, biomass generators, solar thermal systems, and/or other means of generating usable electrical power using renewable energy sources. The collector of renewable energy should supply energy to the system whenever that energy is available, except, for example, when the batteries are fully charged and the load is off. The renewable energy source should be sized and matched to the storage to maximize displacement of non-renewable fuels in a hybrid system. The amount of energy the renewable energy source can provide, the storage and the engine-generator should be also coordinated to allow the engine-generator to operate at maximum efficiency. Minimizing maintenance of the engine-generator is typically very important, as costs for service charges for repairs can represent a significant part of the cost of an ongoing system.

As used herein, the term "non-renewable energy source" may include, but is not limited to, hydrocarbon fuel burned in an engine-generator, a turbine-generator, or a thermal-electric generator (TEG). Typically, an engine-generator is chosen for its high reliability, performance and the desirability and availability of a fuel source. Diesel-power engine-generators are commonly used, although gasoline or propane generators may also be used. The engine-generator is preferably remotely controllable to allow system control for starting and stopping. The generator should be matched to the combination of load demand and the storage-battery charging requirements to maximize operating efficiency, typically at least 50 to 90% loaded.

FIG. 1 shows a simple block diagram of a renewable hybrid system using an engine-generator as a secondary electrical energy source.

FIG. 2 shows a block diagram of a standby UPS system. The utility grid is the only source of energy for this system. The utility continually charges or maintains state of charge on the battery. The battery supplies power to the loads in the event of brownouts or power failures. The inverter begins transferring the power from the battery once an out-of-spec utility condition is detected and the transfer switch is operated. The inverter is typically designed to provide good quality power to the load for a short time until backup power can be supplied, until the load can be safely turned off, or until the utility power returns.

A comparison of FIGS. 1 and 2 reveals similar topology, although some blocks may perform similar functions using different or modified algorithms.

Performance requirements and similarities between the two systems are summarized below:

1. The utility grid is the primary source of power for the UPS system. The grid is replaced by an engine-generator in the renewable energy system, which becomes the secondary source of power for the system.
2. The inverter seldom transfers power in the UPS system. However, the inverter is a major power-handling element of the renewable system. Thus, the efficiency of an inverter in the UPS system is of less importance than in the renewable energy system. Furthermore, the continuous power handling capability of the inverter in the UPS can be less than the inverter for a comparably sized renewable system.
3. The transfer switch performs the same function in either system, but operation is via modified algorithms and includes warm-up and minimum run-times for the engine-generator and the renewable system.
4. The battery storage capacity for the UPS system is typically much smaller than the storage capacity for a comparable renewable energy-system. The charging algorithm for the batteries in a UPS system includes a constant current or taper charge immediately after a period of use, and maintaining the state-of-charge over long periods of time. The charging algorithm for the renewable system includes a high rate of charge during operation of the engine-generator with full-charge voltage signaling turn off of the engine-generator. Renewable energy sources supply energy to the batteries whenever the output exceeds the demand of the load. Full charge on the battery and extra renewable energy signal an additional regulation algorithm that may temporarily remove the renewables from the circuit or provide a battery overcharge protection algorithm to the renewable. A low battery threshold for the UPS systems signals a shutdown condition. A low battery threshold in the renewable system signals the engine-generator to start for battery recharge and continued system operation.

5. The controller or controllers for either system monitor operating conditions and perform the preset algorithms as described above through appropriate signals, contact closures, or contact brakes.

6. The rectifier performs the same function in both systems. The rectifier for the UPS system performs continuously and at lower current levels than the rectifier for the renewable hybrid system. The rectifiers for the renewable system operate only when the engine-generator is running.

Thus, similarities in topology and performance requirements of both the standby UPS system and the renewable system indicate that a modified UPS inverter-type system may be used in a hybrid renewable energy system. However, existing small (1–7 kW) UPS inverter hardware is neither economically nor technically feasible in a hybrid energy system. For example, necessary requirements include increased efficiency of conversion (minimum 80% with desirable at or above 90%), improved battery charging capabilities (faster charging rates when the engine-generator is operating), reduction of standby losses when the inverter is not providing power, and improved continuous power handling.

Therefore, one object of the present invention is to provide a new and novel means for providing a third mode of operation, i.e. allowing the inverter to operate in parallel with the generator.

It is another object of the present invention to allow switching from an inverter to an engine-generator without transients typically associated with such systems.

It is still another object of the present invention to provide switching by using a single power stage, wherein the same switching components are used to charge the battery, to invert the battery power in a stand-alone mode, and to invert the battery power in parallel with an engine-generator.

It is yet another object of the present invention to provide a flexible design which allows for different optimization strategies to be implemented.

It is another object of the present invention to allow an inverter to charge a battery during one part of a sine wave cycle and to deliver power from the battery during another part of the cycle during a parallel mode of operation. It is still another object of the present invention to minimize fuel consumption of an engine-generator.

It is yet another object of the present invention to decrease the time required to charge a battery.

It is still another object of the present invention to substantially eliminate harmonic distortion in load current.

It is another object of the present invention to provide a system which, in a parallel mode, adapts to arbitrary non-linear loads.

It is yet another object of the present invention to provide a power processor which can accommodate one, two, or three phase applications, wherein the processor may operate independently on each of the three phases.

It is still another object of the present invention to provide a power processor which optimizes power flow in a hybrid generator system.

Other objects of the present invention, as well as particular features, elements, and advantages thereof, will be elucidated in, or be apparent from, the following description and the accompanying drawing figures.

SUMMARY OF THE INVENTION

In one embodiment, the present invention provides an AC power processor for delivering power to a load in coordination with an energy storage device and an AC power source comprising an electronic power control means, connecting the energy storage device and the alternating current power source, for selectively directing power from the AC power source to the energy storage device and from the energy storage device to the load, on a subcyclic basis with respect to the AC power source. The processor is capable of operating in at least three modes including: a first mode wherein power is supplied to the load only by the power processor; a second mode wherein the AC power source supplies power to both the load and the power processor; and a third mode wherein both the AC power source and the power processor supply power to the load in parallel. Thus, the processor is capable of adjusting the energy stored in the energy storage device. Furthermore, the processor may be adapted to control the flow of power on a per-phase basis.

In another embodiment, the present invention concerns an AC power processor, for use with a DC voltage source, for delivering power to a load, in parallel and in coordination with an AC voltage source, the processor comprising means for controlling the flow of electrical energy into and out of the DC voltage source, including: (1) a plurality of switching elements connected to the DC voltage source, wherein the switching elements are capable of converting an AC current from the AC voltage source to DC current and directing the DC current to the DC voltage source, and wherein the switching elements are capable of converting a DC current from the DC voltage source and directing the DC current to the load; (2) at least one inductive element interposed between the switching elements and the AC voltage source; (3) means for determining a plurality of switch configurations on a subcyclic basis with respect to the AC power source and based on a desired optimization strategy; and (4) means for switching the switching elements. The processor is capable of operating in at least three modes including: an inverter mode wherein AC current is supplied to the load only by the power processor; a charge-supply mode wherein the AC power source supplies current to the load and the power processor; and a parallel supply mode wherein both the AC power source and the power processor supply current to the load in parallel.

In yet another embodiment, the present invention provides a multi-modal power supply system for delivering power to a load in coordination with an AC power source and a DC voltage source. The system comprises: at least one bridge including a plurality of switching elements capable of AC-DC and DC-AC conversions, wherein each switching element is capable of being positioned in an on state or an off state; at least one means for connecting the bridge to the DC voltage source; at least one means for interconnecting the bridge, the AC power source and the load, including a bridge-AC connection means for connecting the bridge to the AC voltage source, a parallel connection means for connecting the load to the bridge-AC connection means at parallel points, and an inductive means disposed between the bridge and the parallel points; at least one means for sensing the voltage and current of the DC voltage source; at least one means for sensing the voltage and current of the AC power source; at least one means for sensing the voltage and current between the bridge and the inductive means; and at least one control means for changing the positions of the switches on a subcyclic basis based on the sensed voltages and currents. The plurality of switching elements is capable of converting the AC current from the AC voltage source to DC current, and directing the DC current to the DC voltage source. The plurality of switching elements is capable of converting the DC current from the DC voltage source into AC current and directing the AC current to the load. The plurality of switches is capable of being positioned into at least four configurations for each phase, including: a first configuration wherein the DC voltage source supplies a positive polarity voltage to the load across the inductive means, a second configuration wherein the DC voltage source supplies a negative polarity voltage to the load across the inductive means, a third configuration wherein the inductive means supplies a positive polarity voltage to the load, and a fourth configuration wherein the inductive means supplies a negative polarity voltage to the load. The system is capable of operating in at least three modes including: an inverter mode wherein AC current is supplied to the load by either the DC voltage source or the inductive means, or both; a charge-supply mode wherein the AC power source supplies power to the load, the inductive means, or the DC voltage source, or a combination thereof; and a parallel supply mode wherein the AC power source and at least one of the inductive means or the DC voltage source, or both, supply power to the load in parallel.

The system may further be adapted for multiphase operation and includes, for each phase, a respective the bridge, the bridge-to-DC voltage source connecting means, the bridge-AC power source-load interconnecting means, the DC voltage source sensing means, the AC power source sensing means, and the means for sensing voltage and current between the bridge and the inductive means.

The system may also include a switching means disposed between the AC voltage source and the parallel points for selectively disconnecting the AC voltage source.

The control means may change the positions of the switches on a subcyclic basis based on the sensed voltages and currents according to an optimization strategy.

The optimization strategy may also maintain in phase the current and voltage of the AC power source during the charge-supply mode or the parallel supply mode.

The system may further comprise a means for generating a reference waveform in phase with the voltage of the AC voltage source.

The optimization strategy may also minimize the mean integrated square-error between the AC voltage source current and the in-phase reference waveform.

The reference waveform may be sinusoidal, triangular, trapezoidal or some other desired waveshape.

The amplitude of the reference waveform may correspond to the maximum deliverable power of the AC voltage source.

The system may be adapted to optimize the current waveform of the AC voltage source during the parallel supply mode by supplying power or withdrawing power from the parallel connection means on a subcyclic basis.

The system may also be adapted to optimize the current waveform of the AC power source during the charge-supply mode or the parallel supply mode by supplying power or withdrawing power from the parallel connection means on a subcyclic basis.

The system may further comprise a means for generating a reference waveform in phase with the voltage of the AC power source.

The optimization strategy may include minimizing the mean integrated square-error between the AC power source current and the in-phase reference waveform.

The amplitude of the reference waveform may be made to correspond to the maximum deliverable power of the AC power source.

The system may also further comprise means for determining the period of the AC power source, wherein the control means further comprises means for dividing the period into equal time intervals and means for determining the durations of the on and off states of each switching element for each equal time interval.

In yet another embodiment, the present invention provides an AC power supply system for delivering power to a load in coordination with an energy storage device and an AC power source comprising: an electronic power control means connecting the energy storage device and the alternating current power source for transferring power from the power source to the load and the energy storage device, and from the energy storage device to the load, and means for adjusting the energy stored in the energy storage device, with a response time substantially shorter than frequency of the alternating current power source, by regulating the current delivered by the alternating current power source.

In still another embodiment, the present invention provides an uninterruptible power supply system for delivering power to a load comprising: (1) input lines for receiving an AC power input having a waveform with positive and negative half cycles; (2) output lines for providing an AC power output to the load; (3) a battery capable of providing a DC output voltage; (4) a power transformer having a primary coupled to a secondary, the secondary being connected across the output lines; (5) an inverter connected to the primary of the power transformer and to the battery, including switching devices connected in a bridge configuration which are controllable to convert DC voltage power from the battery to AC voltage power at the primary of the power transformer and to supply the battery with power from the primary, the switching devices being responsive to control signals to switch between on and off states; and (6) control means, connected to the switching devices in the inverter, for controlling the power into and out of the inverter on a subcyclic basis relative to the AC power input.

The control means includes: means for sensing the battery voltage, means for determining the polarity of the AC input, means for determining a desired AC power output current, means for generating a sinusoidal reference signal having an amplitude substantially equal to the desired output current, means for comparing the sinusoidal reference signal with the output current to yield a current error signal, and means for generating a pulse width proportional to the amplitude of the current error signal for modulating the inverter switching devices. The switching devices are capable of assuming at least four pairs of configurations based upon the polarity of the error signal and the polarity of the AC input voltage, wherein the switches are pulsed on into a first configuration of each pair for the duration of each pulse width and pulsed off into a second configuration of each pair.

The system is capable of operating in one of a plurality of states, including: a first power supply state in which the battery is capable of supplying power to the load through the inverter, the state corresponding to the first configuration when the polarities of the error signal and the AC input voltage coincide; a second power supply state in which an effective inductance, which includes the effective leakage inductances of the primary and secondary of the transformer, is capable of supplying power to the load, the state corresponding to the second configuration when the polarities of the error signal and the AC input voltage coincide; a first power consumption state in which the AC power input is capable of charging the battery through the inverter, the state corresponding to the first configuration when the polarities of the error signal and the AC input voltage differ; and a second power consumption state in which the AC power input is capable of supplying power to the effective inductance, the state corresponding to the second configuration when the polarities of the error signal and the AC input voltage differ. The system is also capable of supplying power to the load from the battery and the AC power input simultaneously.

The system may further comprise means for maintaining the AC input current in phase with the AC input voltage, and/or at least one switch means for detaching the AC power input from the system.

The control means may further comprise a means for opening and closing the at least one switch means at least as fast as a half cycle of the AC input waveform, and/or a means for selecting between a manual mode of operation and an automatic mode of operation.

The pulse width generation means may further comprise: means for determining the period of the AC power input; means for dividing the period into equal time intervals; means for generating a sampling reference signal; and means for comparing the sampling reference signal and the current error signal to determine pulse endpoints from intersection points of the signals.

The sampling reference signal may be a triangle waveform.

The system may also further comprise means for phase-locking the inverter to the AC power input.

The means for determining a desired AC power output current may also include a means for sensing the load current.

The means for determining a desired AC power output current may further include a means for inputting a load current schedule.

In another embodiment, the present invention provides an uninterruptible power supply system for delivering power to a load comprising: (1) input lines for receiving an AC power input having a waveform with positive and negative half cycles; (2) output lines for providing an AC power output to the load; (3) a battery capable of providing a DC output voltage; (4) a power transformer having a primary coupled to a secondary, the secondary being connected across the output lines; (5) an inverter connected to the primary of the power transformer and to the battery, including switching devices connected in a bridge configuration which are controllable to convert DC voltage power from the battery to AC voltage power at the primary of the power transformer and to supply the battery with power from the primary, the switching devices being responsive to control signals to switch between on and off states on a subcyclic basis; and (6) control means, connected to the switching devices in the inverter, for controlling the power into and out of the inverter on a subcyclic basis relative to the AC power input.

The control means includes: means for sensing the battery voltage; means for determining the polarity of the AC input; means for determining a desired AC power output current; means for generating a sinusoidal reference signal having an amplitude substantially equal to the desired output current; means for comparing the sinusoidal reference signal with the output current to yield a current error signal; and means for generating a pulse having a width proportional to the amplitude of the current error signal for modulating the inverter switching devices.

The switching devices are capable of assuming at least three configurations, including: a first battery-connect configuration which enables current to flow between the battery and the primary when the AC input voltage is positive; a second battery-connect configuration which enables current to flow between the battery and the primary when the AC input voltage is negative; and a battery-isolation configuration which enables current to flow between the switching devices and an effective inductance which includes the effective leakage inductance of the primary and the secondary of the transformer, while substantially preventing current flow between the battery and the switching devices.

The control means is capable of configuring the switches between the first battery-connect configuration, the second battery-connect configuration and the battery-isolation configuration based upon the polarity of the AC input voltage and the error signal.

The switches are modulated into one of the battery-connect configurations for a duration based on the pulse width, and otherwise configured into the battery-isolation configuration. The battery is capable of supplying power to the load through the inverter when the polarities of the AC input voltage and the error signal coincide. The effective inductance is capable of supplying power to the load through the inverter when the polarities of the AC input voltage and the error signal coincide. The AC power input is capable of charging the battery through the inverter means when the polarities of the AC input voltage and the error signal differ. The AC power input is capable of supplying power to the effective inductance by building up a current therein when the polarities of the AC input voltage and the error signal differ.

The system is capable of supplying power to the load from the battery and the AC power input simultaneously; and the system is capable of supplying power to the load in the absence of AC input power.

Thus, the inverter is capable of operating in at least three modes, including: a battery charging mode in which the AC input power is rectified and supplied to the battery; an inverter mode in which the battery supplies AC power to the load; and a parallel mode in which the AC input power and the battery simultaneously supply AC power to the load.

The control means may further be capable of configuring the switches according to an optimization strategy.

The above, and other objects, features and advantages will become apparent from the following description and the accompanying drawings.

BRIEF DESCRIPTION OF THE DRAWINGS

Understanding of the present invention and the various aspects thereof will be facilitated by reference to the accompanying drawings figures, submitted for purposes of illustration only and not intended to limit the scope of the invention, in which:

FIG. 6 shows the operation of the power processor when the processor is supplying power during the positive path of the generator cycle and QA is on;

FIG. 7 shows the operation of the power processor when the processor is supplying power during the positive path of the generator cycle and the QA is off;

FIG. 8 shows the operation of the processor when acting as a battery charger and consuming power during the positive half of the generator cycle and QA is on;

FIG. 9 shows the operation of the processor when acting as a battery charger and consuming power during the positive half of the generator cycle and QA is off;

FIG. 10 shows the operation of the processor when acting as a battery charger and consuming power when the error signal is negative during the negative half-cycle of the generator and QC is on;

FIG. 11 is a diagram showing the operation of the processor of the present invention during the negative half-cycle of the generator when the error signal is negative and QC is off;

FIG. 12 is a diagram of the processor of the present invention during the negative half-cycle of the generator when QC is on and current is supplied to the load, thereby supplementing the diesel current;

FIG. 13 is a schematic diagram of the present invention during the negative half-cycle of the generator wherein QC is off and current continues in the same direction due to inductance;

FIG. 14A shows a simplified block diagram of the present invention operating in parallel with the generator;

FIGS. 14B–14G show several plots of idealized performance of the power processor according to the present invention operating in the parallel mode;

FIG. 14B shows a sinusoidal current at the rated output load;

FIG. 14C illustrates a non-linear load current;

FIG. 14D shows the generator current at 25% of its rated output;

FIG. 14E shows the current of the power processor when the generator current reaches 25% of its rated output;

FIG. 14F illustrates the generator output current at 100% of its rated output;

FIG. 14G shows the current of the power processor according to the present invention when the generator output current is at 100% of its rated output;

FIG. 15 shows the results of a simulation corresponding to 25% load current with 96 samples per second, wherein three plots show the non-linear load current, the diesel generator current, and the current of the power processor;

FIG. 16 shows simulation results of the present invention at 100% load current with 96 samples per cycle;

FIG. 17 shows simulation plots similar to those found in FIG. 15 but using 192 samples per cycle;

FIG. 18 shows simulation results of the present invention similar to those found in FIG. 16 but using 192 samples per cycle;

FIG. 23 shows a power plot where the load power was stepped up and the power processor transitioned from delivering no power to the battery to operating in parallel with the generator, thereby supplying the difference between the demand and the generator power;

FIG. 24 shows one phase of a non-linear load current and the generator current being made more nearly sinusoidal by the power processor according to the present invention;

FIG. 25 shows the generator voltage, the load voltage, the generator current, and the load current for a load with a 0.5 power factor wherein the power processor was operating to optimize the current waveform produced by the generator.

DETAILED DESCRIPTION OF THE PREFERRED EMBODIMENTS

Reference should now be made to the drawings figures, on which similar or identical elements are given consistent identifying numerals throughout the various figures thereof, and on which parenthetical references to figure numbers direct the reader to the view(s) on which the element(s) being described is(are) best seen, although the element(s) may also be seen on other views.

One aspect of the present invention is a power processor designed to optimize power flow in a hybrid generator system that has three energy sources: a photovoltaic array, a battery, and a diesel generator.

Figure 1:
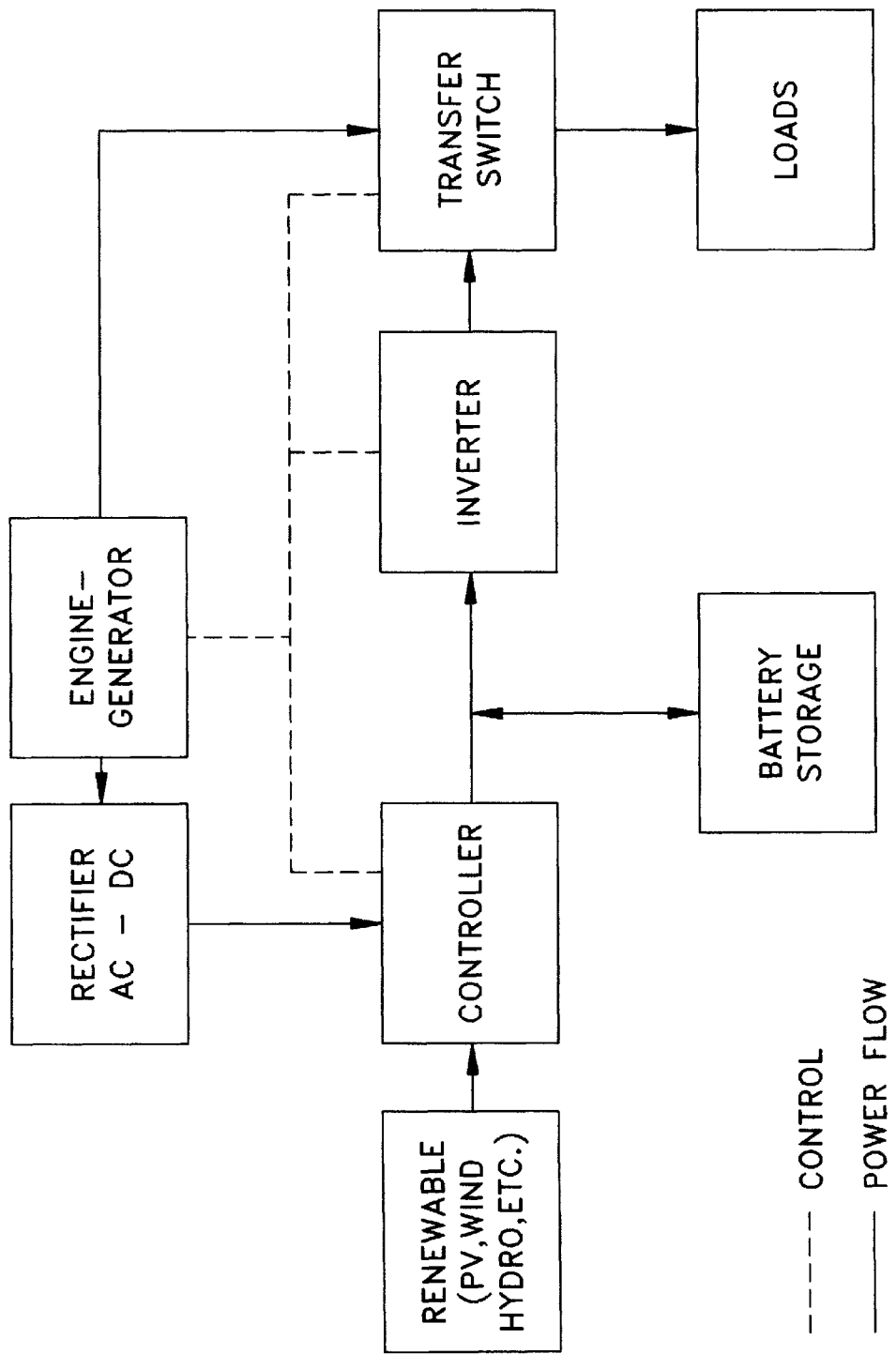
FIG. 1 is a diagram depicting a renewable hybrid energy system according to the present invention.
Figure 2:
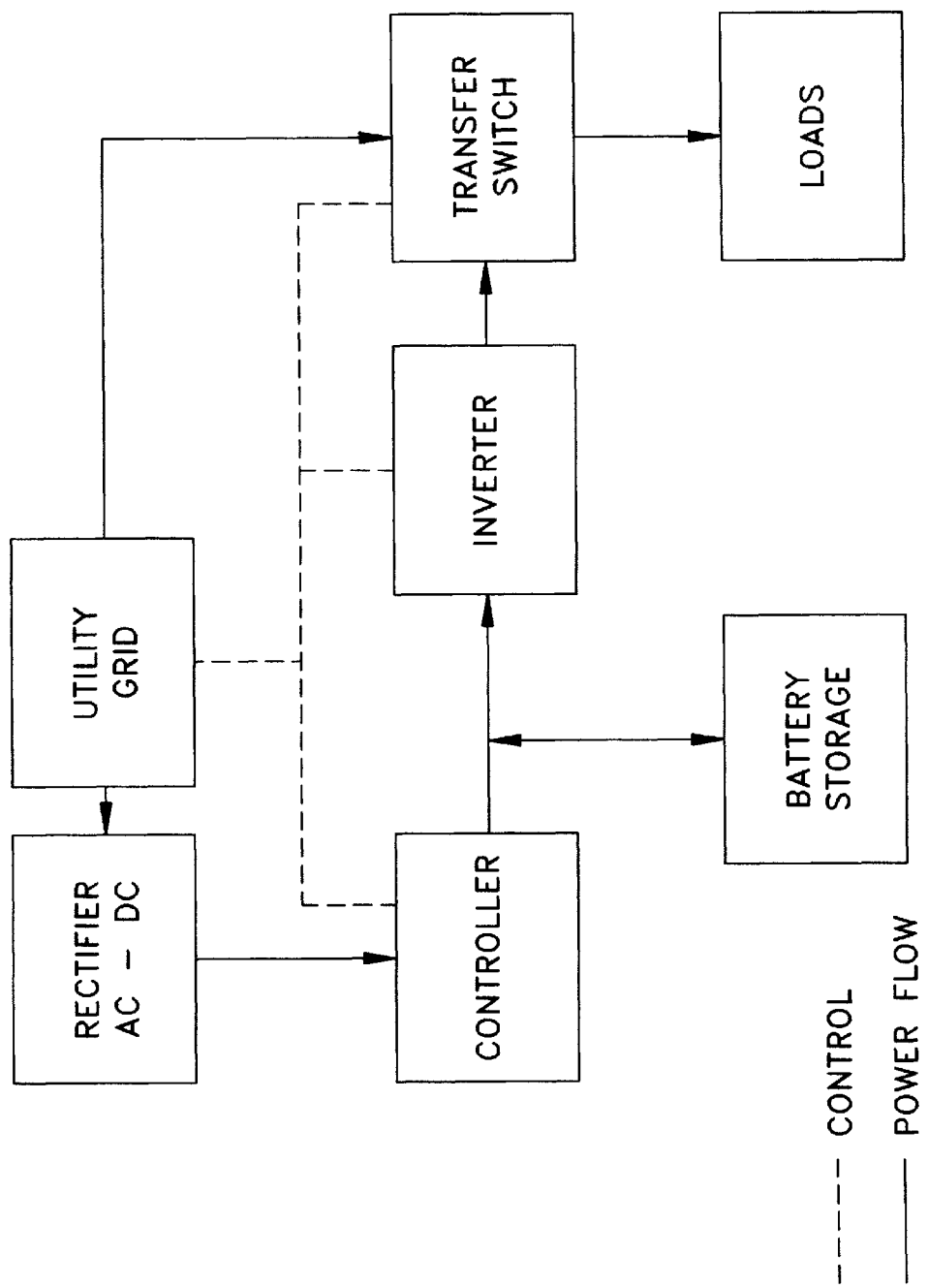
FIG. 2 is a diagram depicting a standby uninterruptible power supply system used in conjunction with a utility grid, according to the present invention.
Figure 3:
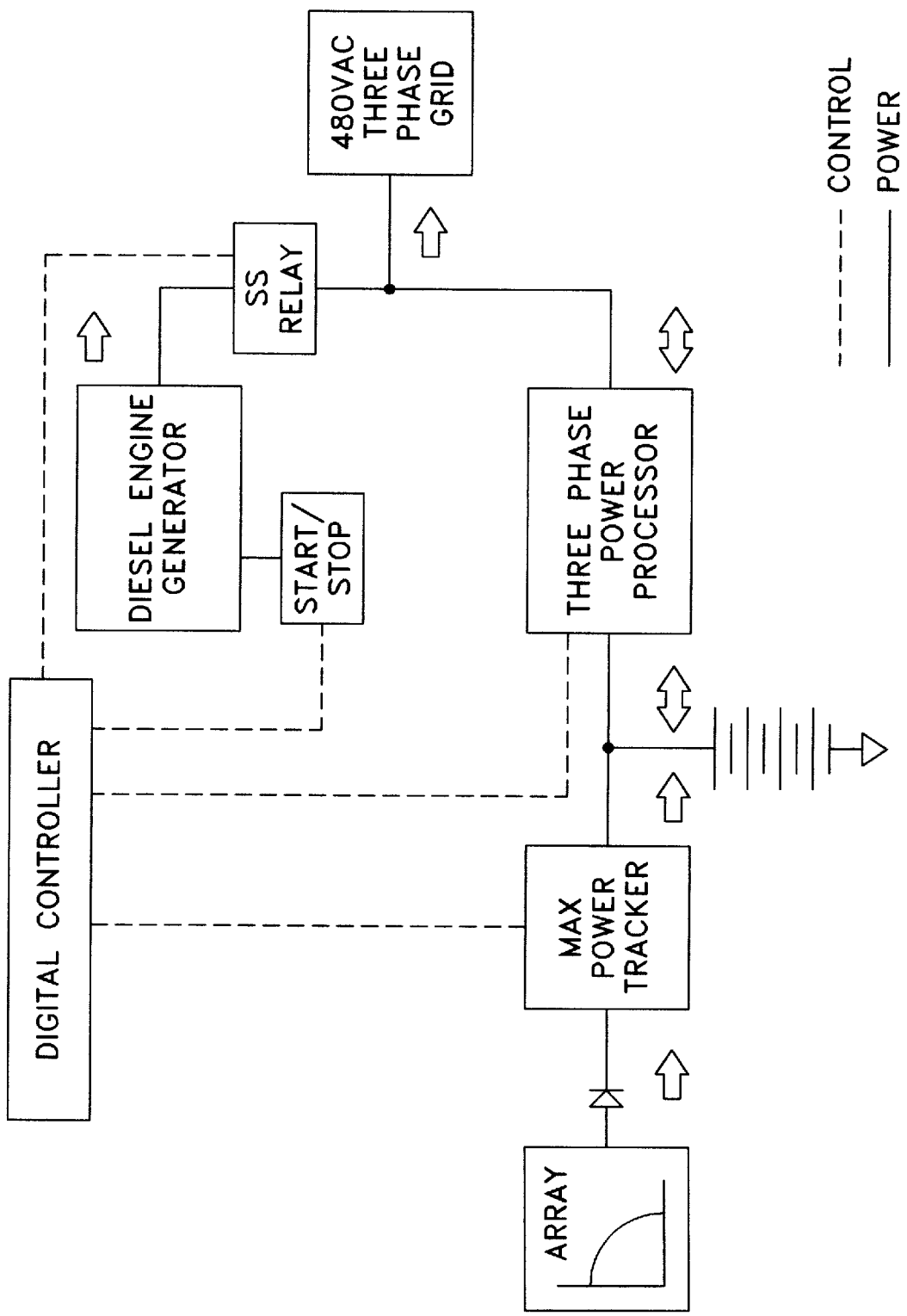
FIG. 3 is another schematic diagram of a hybrid energy system including a power processor according to the present invention.

FIG. 1 shows a block diagram of a hybrid system with its three energy sources and a three phase load connected through a three phase 480 VAC grid. The photovoltaic array is connected to the battery through a Max Power Tracker. The Max Power Tracker (MPT) is a DC to DC converter that extracts the maximum power possible from the array as long as the array voltage exceeds the battery voltage and the battery voltage is less than its float charge voltage. The remainder primarily focuses on the AC connection between the diesel-generator, the power processor and the load. The PPC Controller uses algorithms to determine when to operate the diesel-generator. A solid state relay separates the diesel generator from the load and the power processor. The SS Relay consists of three single phase circuits, one for each phase of the generator output. Each single phase circuit includes back-to-back SCR's that are controlled on each half cycle to connect or disconnect the diesel generator from the power processor and load, as further described below. Thus, while the diesel is warming up, the SS Relay keeps the diesel isolated from the load.

The PPC controller algorithm requires managing a three phase load on a per phase basis. Operating on a per phase basis has significant advantages in remote village applications since there is a reasonable probability that one phase may become overloaded while another phase is underutilized. With the present invention, it is possible that the underutilized phase can charge the battery while the overloaded phase draws on battery power. Thus, load may be synthetically transferred from one phase to another. The desirable end result is load balancing among the phases whenever one or two phases are in an overload condition.

The inverter, or power processor, may operate in one of three modes, with smooth transitions from one mode to the next.

In the battery charger mode, the inverter charges a battery from a generator source and thereby places a load on the generator.

In the inverter mode, the inverter supplies power from the battery to the load with the generator source turned off.

In the parallel mode, the inverter operates in parallel with the generator to achieve any of several design goals including, but not limited to: providing a smooth transfer from the inverter mode to the battery charger mode; supplementing the power from the generator to increase the total possible load; optimizing fuel consumption of the generator; optimizing the current waveform shape so that non-linear loads do not introduce too much distortion. In one preferred embodiment, the processor utilizes a sampled data control system and a single set of switching elements in all three modes.

The generator may be a diesel powered generator, a gasoline powered generator, or a generator fueled by some other means. Typically, the delivered cost of this fuel is the primary cost in providing the required power.

Figure 4:
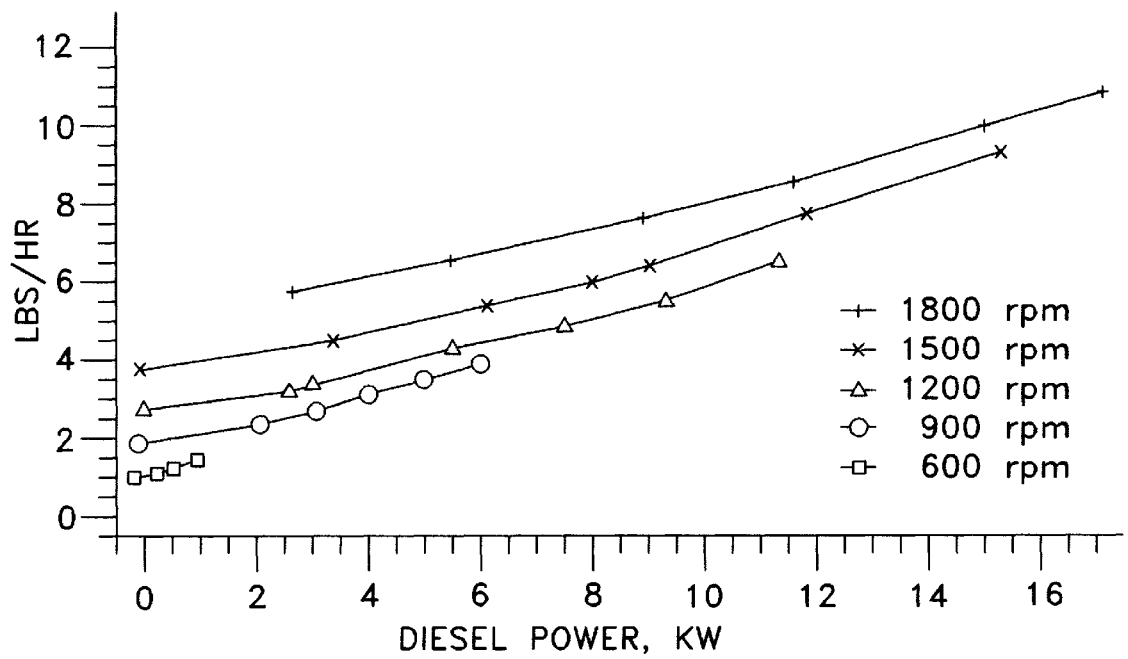
FIG. 4 shows a plot of power generated versus fuel consumed for a typical diesel generator.

As an example of the fuel consumption of such devices, FIG. 4 shows a plot of power generated versus fuel consumed for a typical diesel generator. The curve shows that such generators are most fuel efficient, measured in terms of maximizing power per unit of fuel consumption, when operated at full load. In addition, there is significant fuel consumption at low load. Thus, it is known that optimizing a hybrid system includes turning off the generator at low loads and supplying power from a battery storage system during those periods. The battery system is then recharged after the generator is turned back on. The present invention extends those principles by including an operating mode in parallel with the generator.

Figure 5:
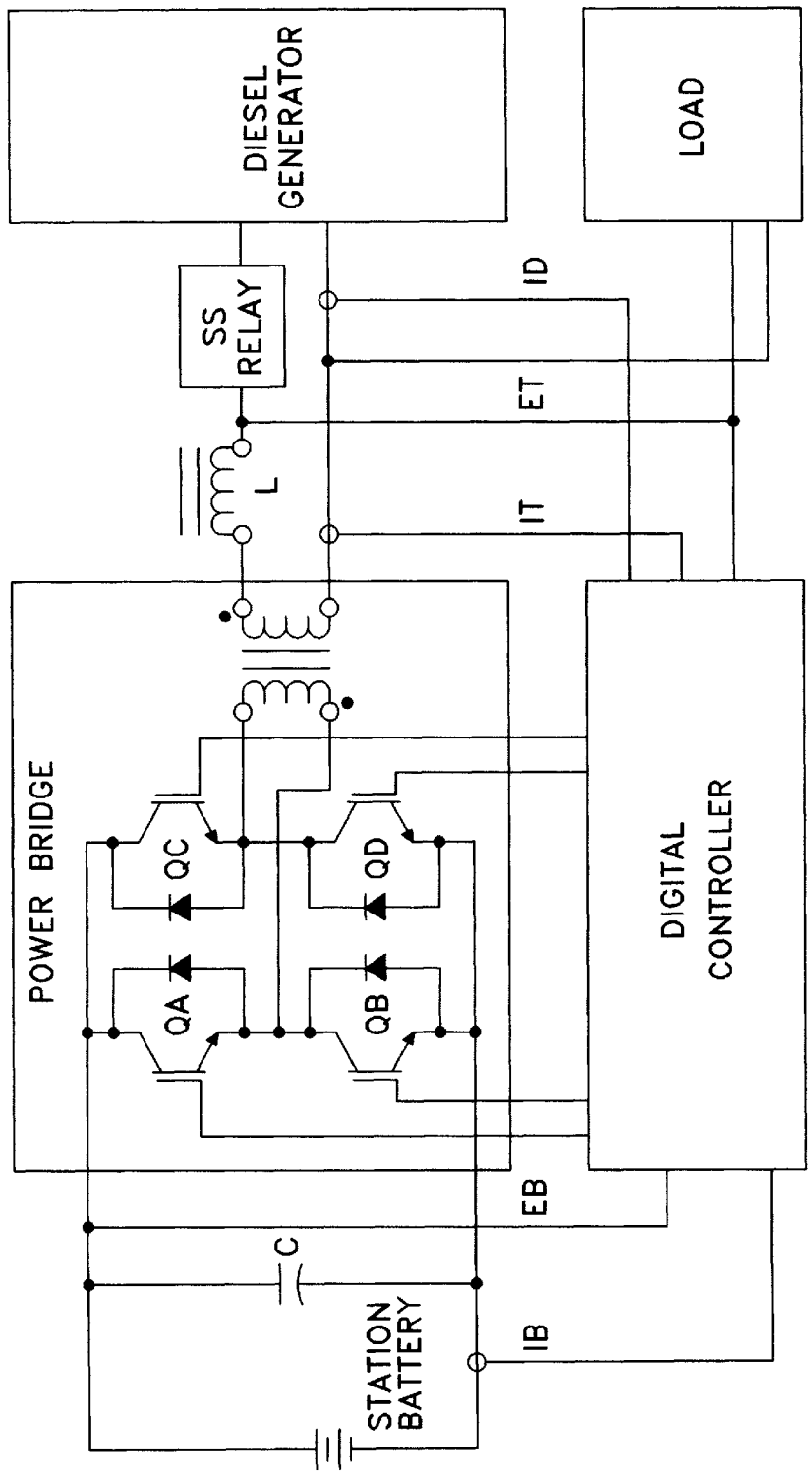
FIG. 5 is a diagram of a one-phase version of the power processor according to the present invention.

FIG. 5 shows a diagram of a one-phase version of the present invention. The electronic switches are shown as IGBT's, although many different types of electronic power devices, as well as any associated control circuitry required to operate such devices, may be utilized instead of the IGBT's. Examples of such electronic power devices include, but are not limited to, transistors, darlington transistors, SCR's, GTO's, IGT's, MOSFET's, HEXFET's, diodes, and/or combinations of these devices. The implementation of such devices is known to those skilled in the art.

Thus, the power controller sends signals to the switches and controls the mode of operation of the power processor. The power controller may be autonomous or may be manually controlled, depending upon the application.

In a manual mode, an operator would decide which of the three modes of operation is desired, and the power controller would send the appropriate signals to the switches.

In an autonomous mode, the power controller would switch between the three modes of operation depending on a desired system optimization. Examples of optimization strategies are described below.

In FIG. 5, the individual switches may consist of single electronic switches, or pairs of electronic switches. In the latter case, the determination of which pair of switches is used may depend upon the direction of current in the switch.

As mentioned above, the design of a switching system to operate on both the battery charger mode and the inverter mode has been previously described. The present invention allows operation in a parallel mode. The power controller accepts as inputs measurements of the battery voltage level, EB, the processor current, IT, the diesel current, ID, and the load voltage, ET (which equals the output voltage of the processor. The controller is preferably designed to have a subcyclic response, i.e., based on measurements at many sampling times per cycle and a predetermined optimization strategy, the controller computes the optimum switch configuration during a sampling period, and the controller sends the appropriate switching signals to the electronic switches. In the parallel mode, the inverter is phase-locked to the generator and delivers power to the load.

FIGS. 6–13 illustrate the operation of the inverter or power processor in eight typical configurations. The eight configurations are generally characterized by three items: the polarity of the generator voltage (and also of the generator current which is controlled to be in phase with the voltage); the polarity of the error signal from the control circuit; and the switching mode status within a sample. The length of time the battery voltage is applied to the transformer is determined at the beginning of each sample period, and during the application of this voltage to the transformer, the switch mode is designated as being "ON." During the remainder of the period, the switch mode is designated as being "OFF."

The particular implementation of the control system described at this point, by way of example, utilizes a high gain controller driven by the error between a reference signal and the actual generator voltage. Alternate implementations may also be used. For example, one possible alternate realization is to define the error signal as the difference between the load current and the desired generator reference. In either case, the error signal would be that referred to in FIGS. 6–13.

The key chart in the lower right hand corner of FIGS. 6–13 shows the three values to which the current flow corresponds. Also shown in each chart are the transistors switch statuses and the designation of whether the circuit inverter is supplying or consuming power. Note that the inverter may switch between supplying and consuming power within one period of the generator source. The power processor consumes power when the polarity of the error and the polarity of the generator are not equal, and the power processor supplies power when they are equal.

Figure 6:
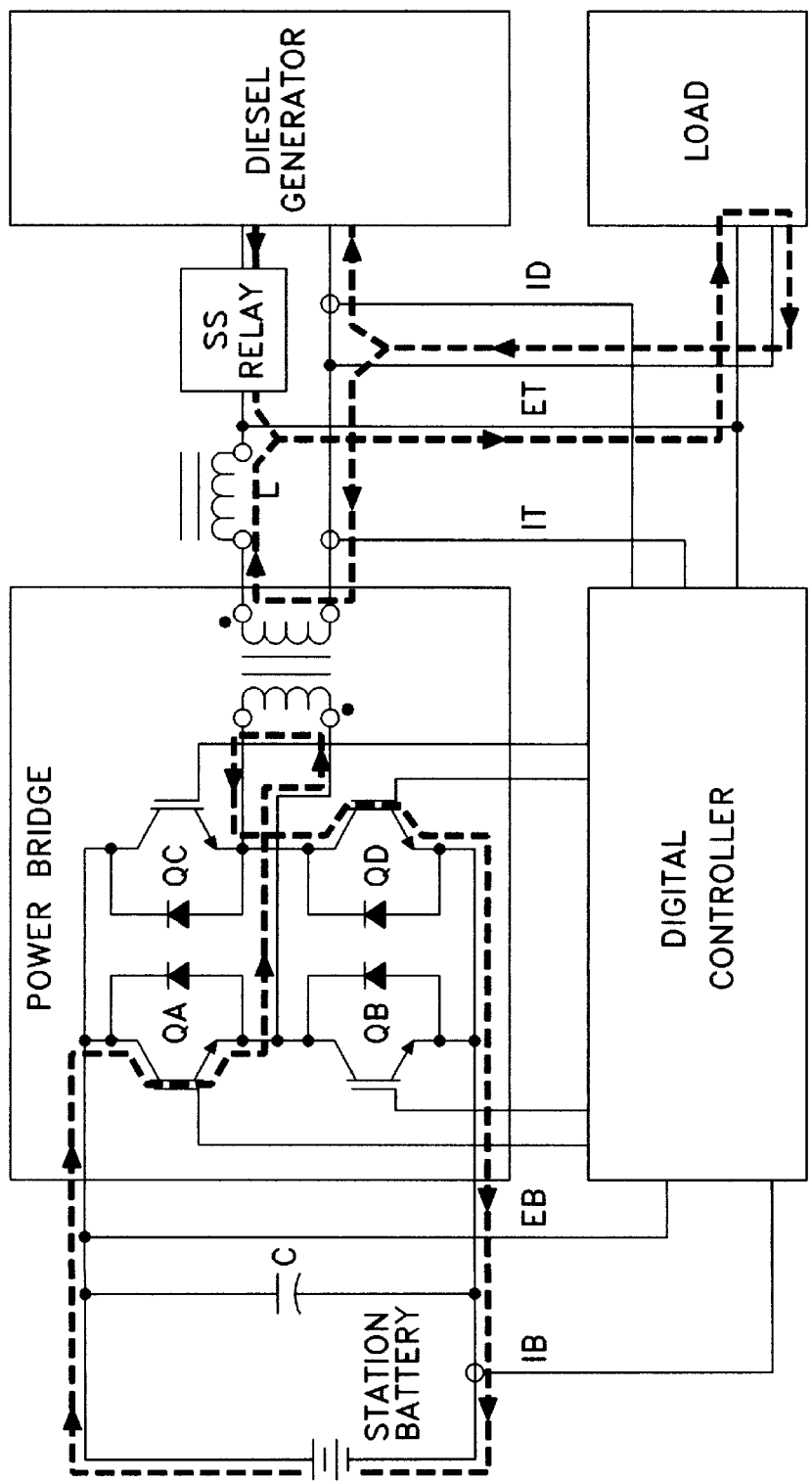
FIGS. 6–13 illustrate the operation of the inverter or power processor according to the present invention in eight typical configurations.
Figure 7:
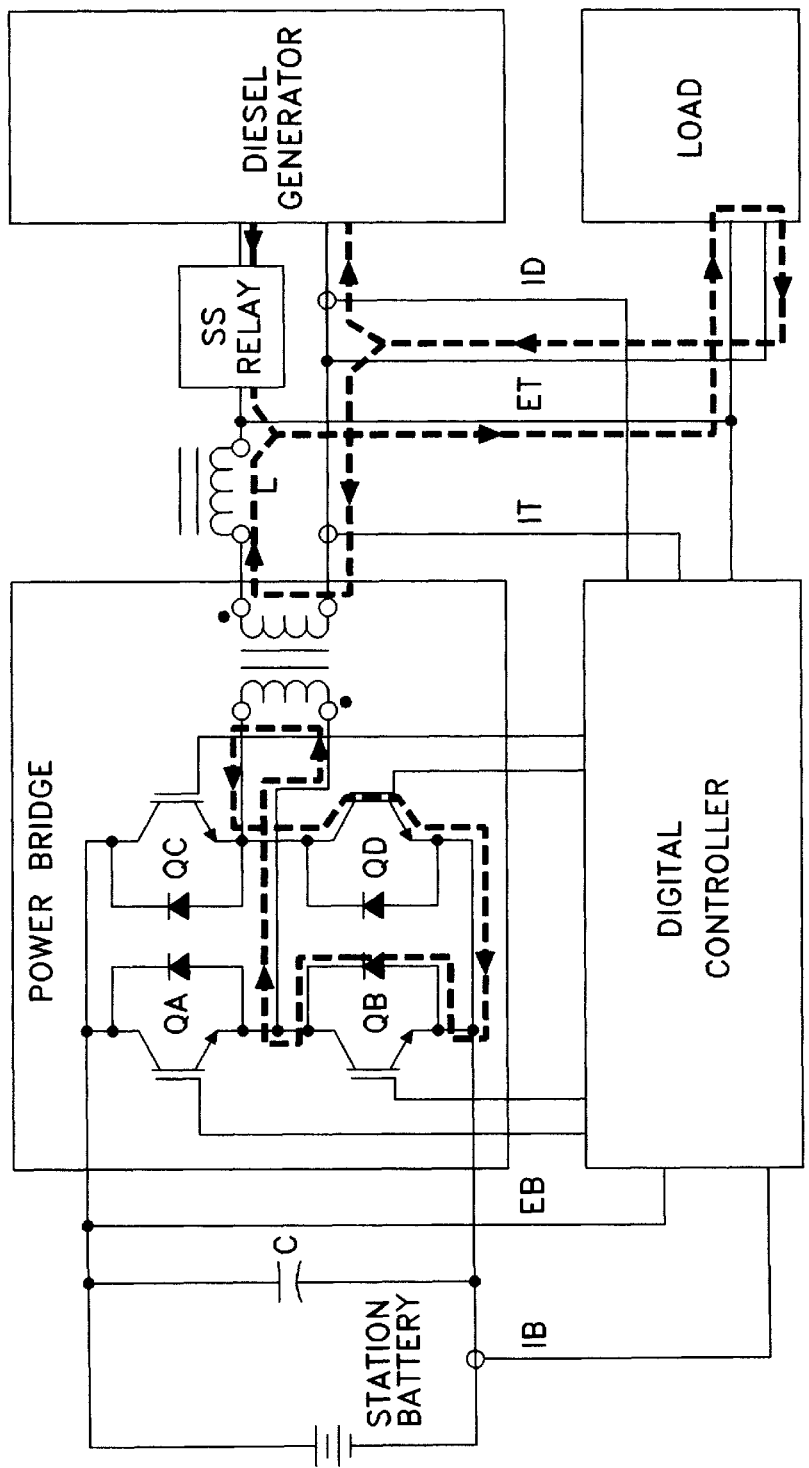

FIGS. 6 and 7 show the operation of the power processor when the processor is supplying power during the positive path of the generator cycle. When QA is "on" as in FIG. 6, the battery voltage appears across the transformer with positive side on the dotted terminal. The current enters the dotted terminal, both transistors QA and QD conduct, and the inverter supplies current. When QA is "off", as in FIG. 7, the inductance forces the current to continue in the positive direction, using the diode of QB for the return path.

Figure 8:
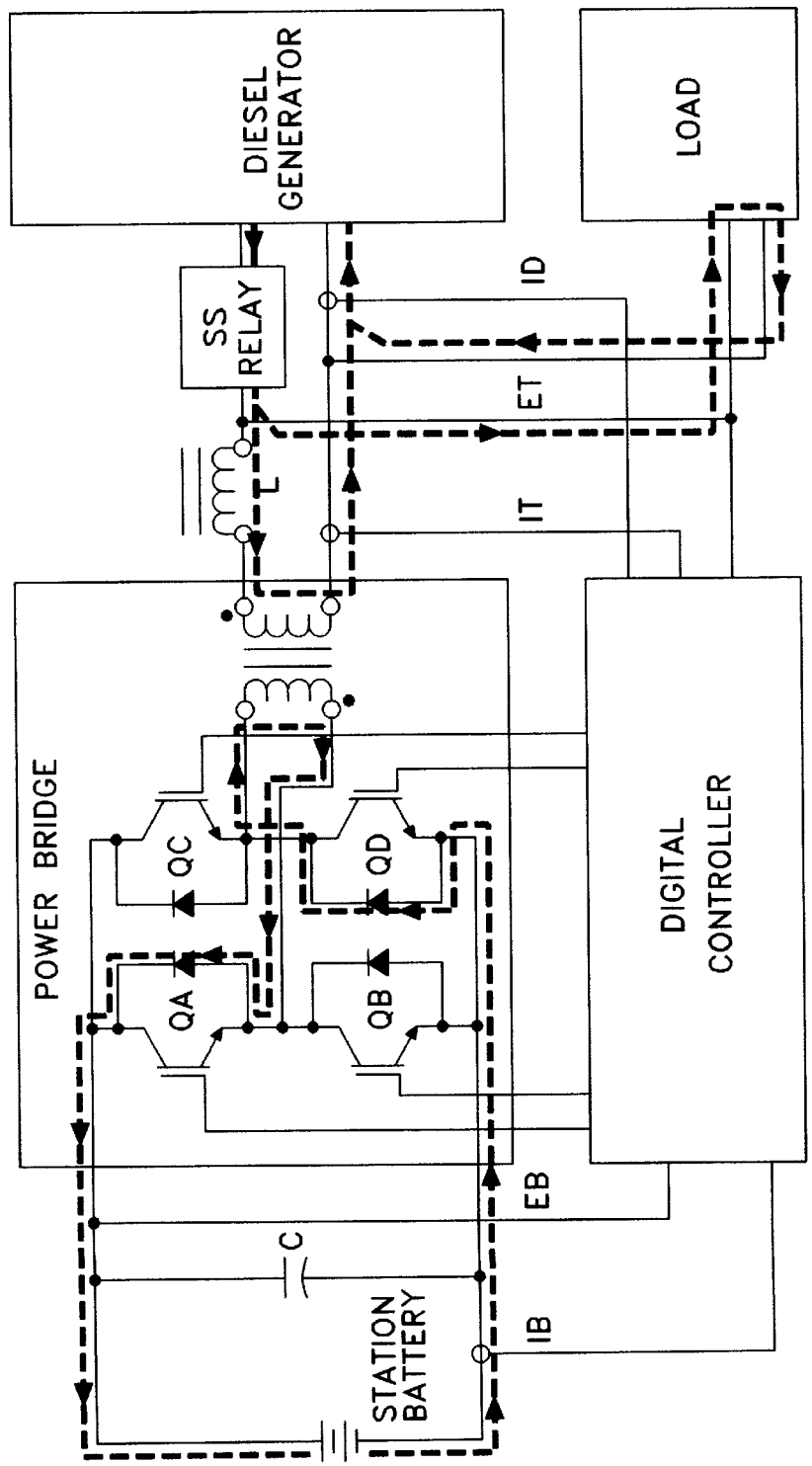
Figure 9:
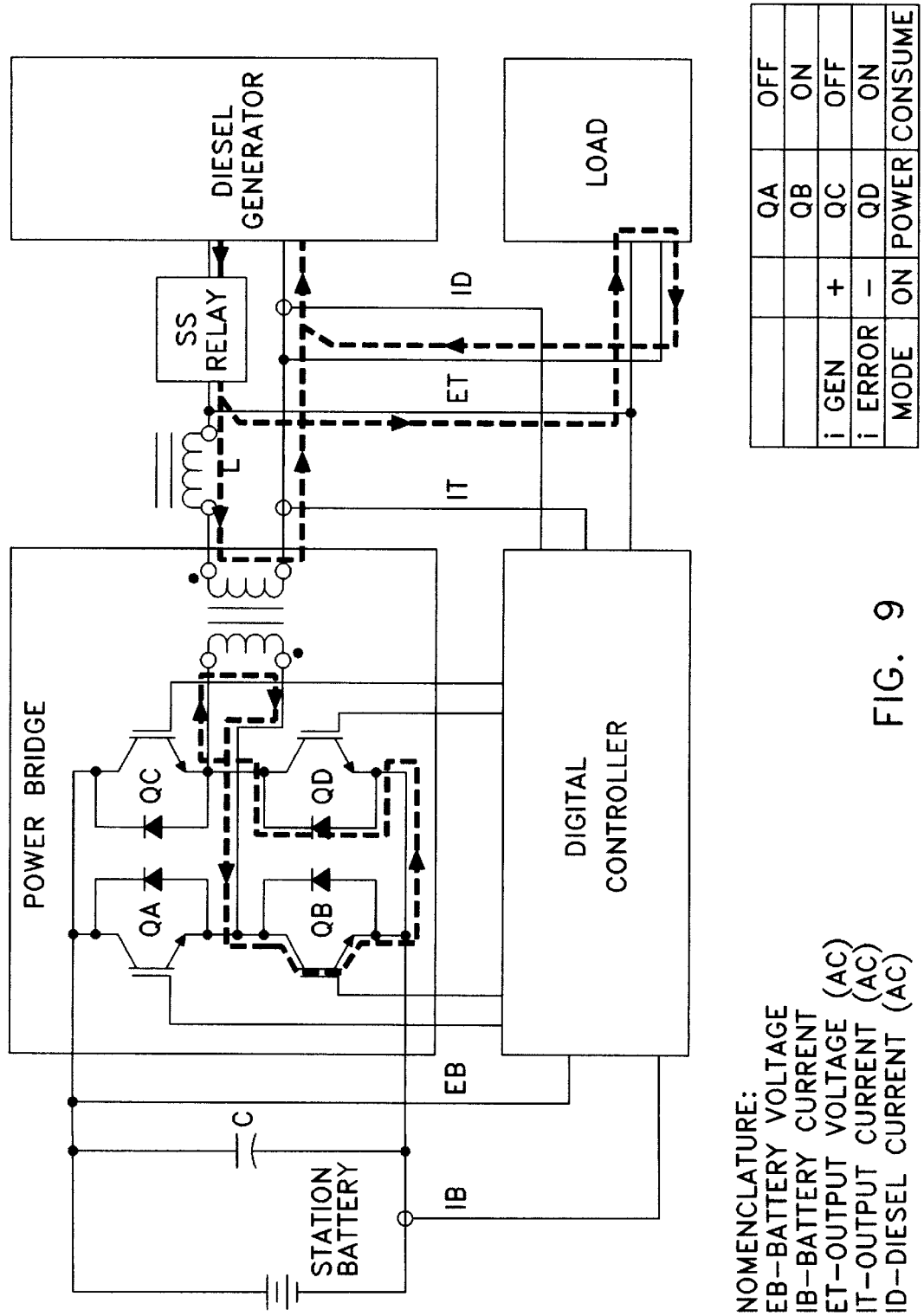

FIGS. 8 and 9 show the operation of the power processor when acting as a battery charger and consuming power during the positive half of the generator cycle. When QA is "on", as in FIG. 8, the diode of QA conducts. When QA is "off", as in FIG. 9, QB conducts. The current charges up in the inductance to such a level that when QA is turned "on", as in FIG. 8, the current continues to be consumed by the power processor and the battery charges.

Figure 10:
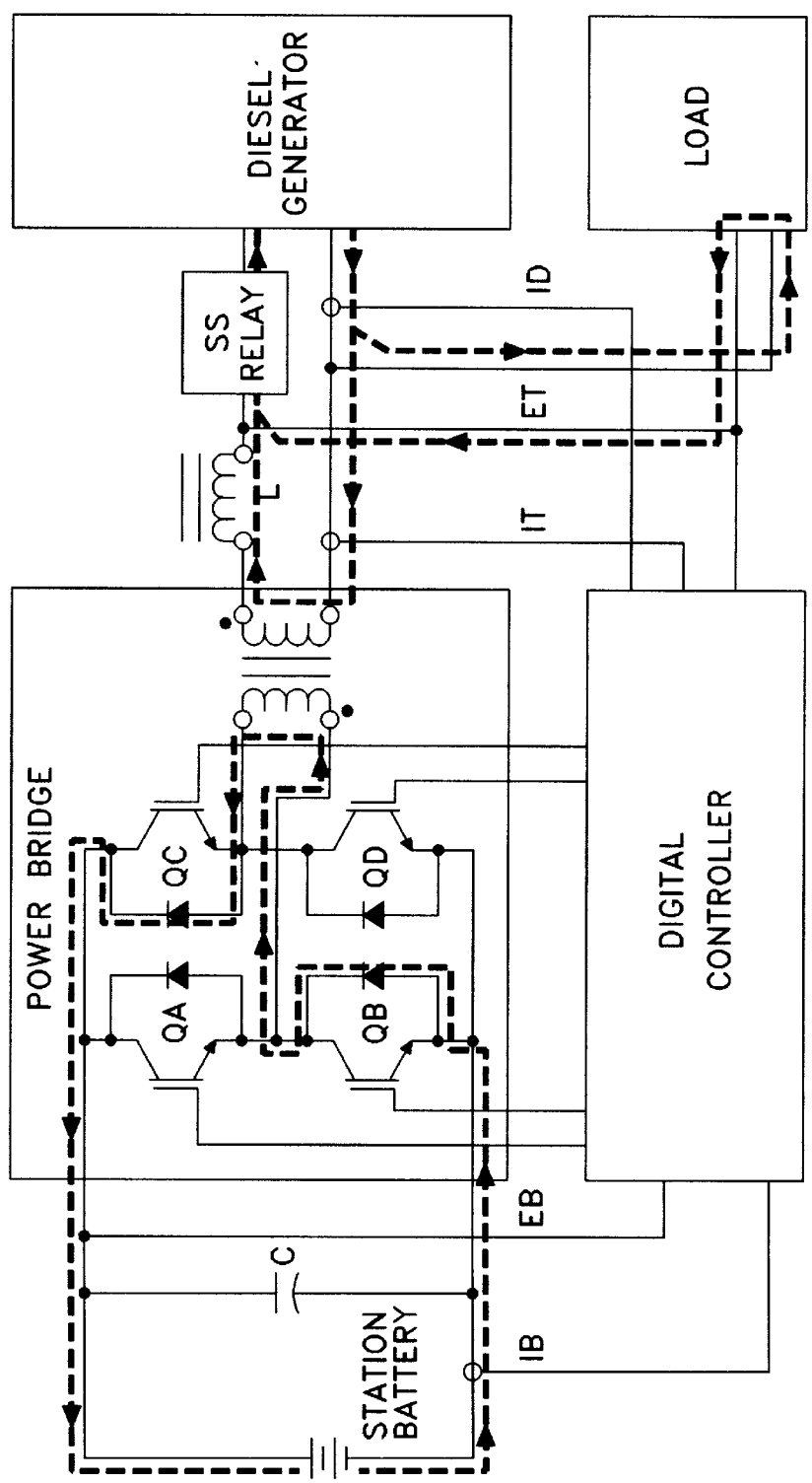
Figure 11:
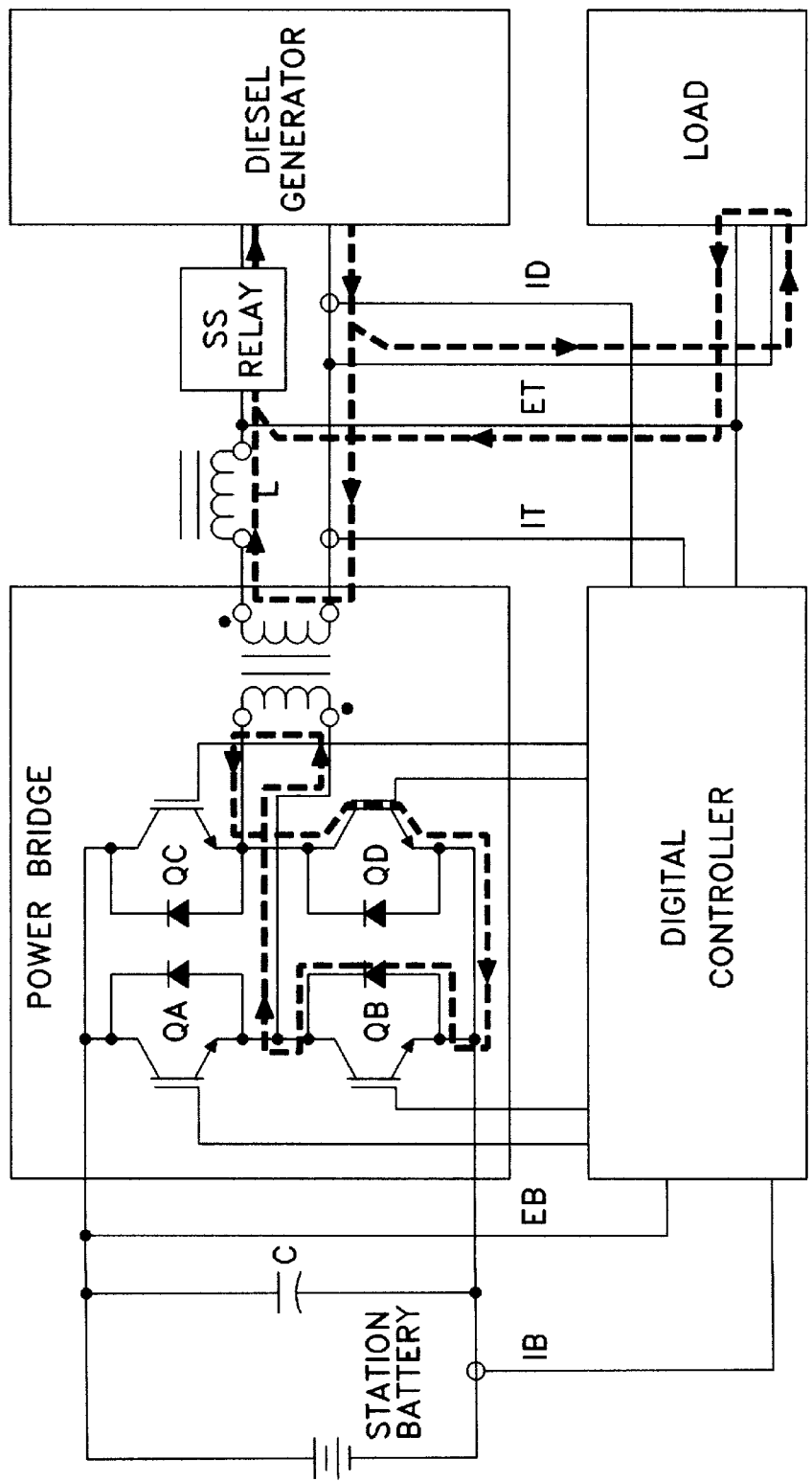

FIGS. 10 and 11 show operation similar to that found in FIGS. 8 and 9. During the negative half-cycle of the generator, the power processor consumes power charging the battery when the error signal is negative. The charging occurs while QC is "on" through the diode and QC, as in FIG. 10. The current and the inductance grows when QC is off, as in FIG. 11.

Figure 12:
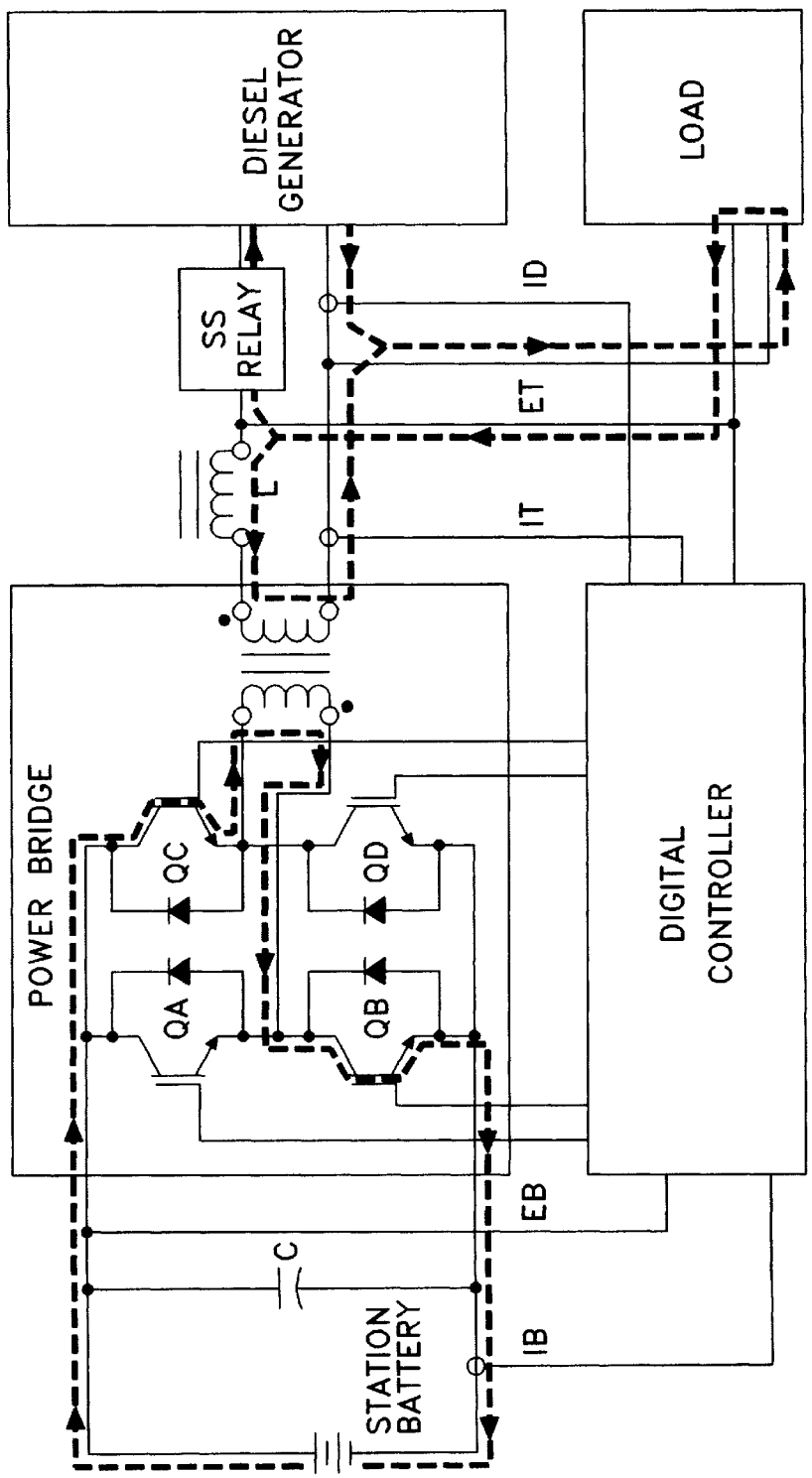
Figure 13:
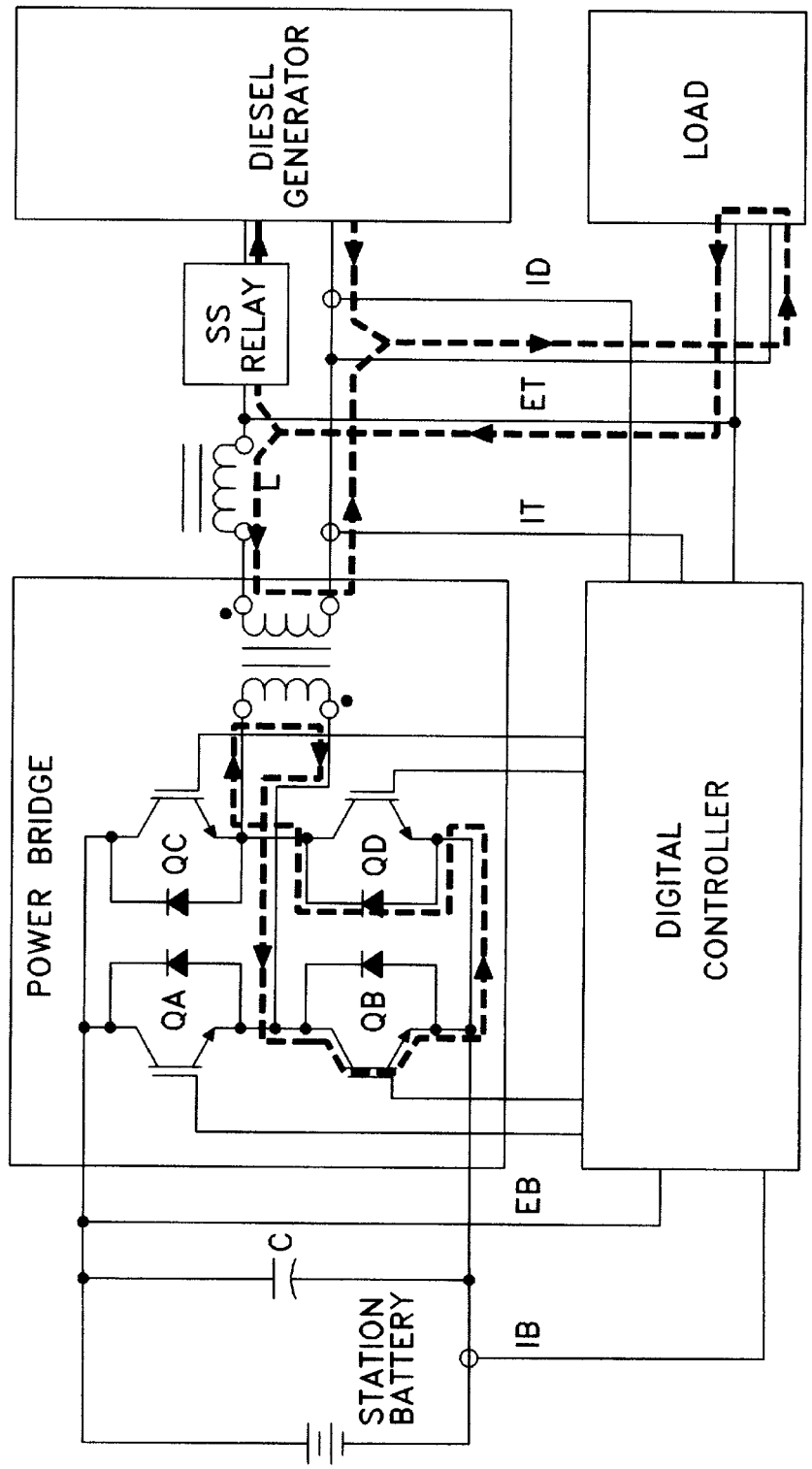

FIGS. 12 and 13 show operation similar to FIGS. 6 and 7. During the negative half-cycle of the generator, the power processor supplements the generator current when the error is negative. When QC is "on", the current is supplied to the load, supplementing the diesel current. When QC is "off", the current continues in the same direction due to the inductance.

With regard to switching of the transistors, during the positive half-cycle the generator, QC is fixed "off" and QD is fixed "on". Thus, all of the switching is due to turning QA "on" and "off", with QB "off" while QA is "on" and QB "on" while QA is "off". During the negative half-cycle, QA is fixed "off" and QB is fixed "on". Then QC and QD switch, with QD the opposite of QC.

With regard to the modes of operation, eight configurations of operation are shown in FIGS. 6–13, however, other configurations are possible. For example, in FIG. 7, if the off-time is too large, the current may actually reverse briefly, giving a current flow similar to that shown in FIG. 9. By way of further example, the load current shown in FIG. 9 is shown to have the same polarity as the generator current, although this does not need to be the case.

One optimization strategy for the present invention is to provide a transfer from the inverter mode to the battery charger mode such that the transients are minimized. For many generators, such as diesel generators, if the load is increased instantaneously, the voltage level drops and the frequency drops. It may take several cycles for the voltage and frequency to increase back to the nominal values. In a particular embodiment, the present invention first turns the diesel on, letting it warm up prior to connection to the load. Second, the inverter is phase-locked to the generator, so that its frequency matches the frequency of the generator and is in phase with it. Third, the inverter voltage is controlled to match the generator voltage. During all of these steps, the inverter is supplying all of the power to the load. Next, the diesel is connected to operate in parallel with the inverter, with the inverter switching from inverter mode to parallel mode. The inverter is controlled to supply all of the current to the load initially, then is allowed to supply a steadily decreasing percentage of the load. The inverter smoothly changes to battery charger mode until its output goes to zero.

By way of further example, a second optimization strategy is to allow the inverter to supplement the power output by the generator, thereby increasing the total power available for delivery to the load. In this scenario, a new load may be scheduled to be turned on at a particular time such that the total load required at that time exceeds the maximum load rating of either the generator or the inverter individually. The inverter is switched to parallel mode and is phase-locked to the generator. The system is then ready for the additional load to be switched on. An additional constraint, i.e. that the diesel current be a sinewave, as discussed in the next optimization strategy, may be used. This additional constraint would typically be satisfied, provided the load is not too large or not too non-linear, depending upon the application.

By way of further example, a third optimization strategy would be to maintain a current wave form at the output of the generator which is a sinusoid in phase with the voltage output of the generator. This optimization mode takes full advantage of the flexibility of the present invention, because the inverter may be charging the battery during part of each cycle and may be delivering power to the load during another part of each cycle. Thus, a non-sinusoidal current may be delivered to the battery, since the battery can accept highly non-linear currents. The controller may compute the desired next current level at the output of the diesel, for example when the controller has a sinusoidal reference signal. The amplitude of this reference signal may be determined by the load level. Then, based on the present current level and the load measurements, optimal switch positions may be computed during each part of the cycle.

A fourth optimization strategy would be to maintain the power output of the generator at the full load current level, and to keep that current in phase with the voltage at the output of the generator and to maintain the sinusoidal shape. The fourth strategy is similar to the third strategy with the additional feature that the current level is defined to be full load current. The fourth optimization strategy would typically be important in operating a generator most efficiently in terms of minimizing fuel consumption per unit of power delivered at full load. Furthermore, among all possible full load current waveforms, a sinusoidal waveform in phase with the voltage maximizes real power delivered.

It should be noted that the power processor of the present invention may operate in a parallel mode with an AC source such as an engine generator, where the source does not have negligible impedance as an ideal utility would. The present invention can take into account this finite impedance and other operating characteristics of the engine generator during the parallel operation mode.

Thus, the power processor of the present invention can take into account the finite impedance and other operating characteristics of an engine generator. During the parallel mode of operation, the power processor can control the current out of the generator to match a desired waveform. By so doing, the response is made independent of the impedance of the generator. Furthermore, the power processor can be tuned specifically for one generator. The response of the generator to a step change in load can be measured. Such a step change induces transients in the frequency and voltage out of the generator. These transients may be characterized in terms of approximate first or second order differential equations. In turn, these differential equations determine transfer functions for the generator. The line from the generator to the load typically has some impedance (inductive) that can be measured. Given these transfer functions and impedance, one skilled in the art may determine differential equations for the output current as a function of the switch positions. The optimal switching patterns for the next sample may then be found by computing the currents in the next interval, comparing them to reference currents, and finding the switch positions that make the computed currents as close to the desired currents as possible.

The control of changing from one mode of operation to another may be effected manually or automatically. In a manual mode, an operator would select a desired mode with a manual or electronic switch, the output of which is easily used to control operation by one skilled in the art. In the automatic mode, a specific optimization criterion is decided upon, for example, as discussed above.

Thus a mode may be selected to maintain the current waveform at the output of the AC generator as close to a sinusoid as possible, with amplitude corresponding to the maximum output. This mode would optimize the performance of most generators in terms of energy per unit of fuel consumption. The energy stored in the battery is monitored. If the load is less than the maximum, then the excess energy is delivered to the battery for charging. At the point that the energy stored in the battery is sufficient, the power processor, which is already phase-locked to the AC generator, switches instantaneously to take over the load from the generator, disconnecting the generator from the load. The generator is subsequently turned off. Under normal operating conditions, the power processor supplies power to the load until the battery discharges to a preset level. At that point in time, the generator is restarted, but not connected to the load. The power processor phase-locks to the generator, using standard phase-lock loop technology, and the output voltage of the power processor is locked to the amplitude of the generator voltage. After these two events have taken place, the generator is reconnected to the load, with the power processor initially supplying all of the current. At this point they are operating in parallel. Next, the optimization strategy is employed and the current out of the power processor ramps to the desired value, and the process above repeats. Many other events may take place to alter this strategy including: large changes in the load which may require the parallel operation, failure of the AC generator, limits on how long the generator may be left off for maintenance purposes, etc.

The above logic may be implemented into either a microprocessor or a programmable logic array.

Preferably the voltages and currents of the three phases are each measured. In a current control mode, the actual currents are compared to desired currents. Switch positions are computed so that the next sampled currents are as close as possible to the next desired currents. However, this computation does not take into account the direction of power flow. For example, if a generator is rated at 30 kW, or 10 kW per phase, and the actual loads on the three phases are 12 kW, 5 kW, and 10 kW, respectively, then the third phase is operating at the generator limit. The second phase could be used to store 5 kW, while the first phase requires the power processor to supply 2 kW. Thus, there is a net storage of 3 kW, while 2 kW of power synthetically transferred from the second phase to first phase. Ultimately, there is a per phase limit on the power that can be delivered. However, up to that limit, the power flows in the three phases can be in different directions.

It should be noted that many existing inverters can be classified as either current control or voltage control. For example the Bimode, as described by O'Sullivan [PCIM Magazine, p. 42 (December 1988)] and Bower et al. [IEEE AES Magazine, p. 16 (August 1990)], uses a current control mode of operation for the battery charge mode and a voltage control mode of operation when operating as an inverter in place of the AC generator. However, the present invention comprises a power processor having a third mode of operation in parallel with the AC generator which requires a modified current control mode of operation. In a preferred embodiment the current waveform is controlled, however the control objective is not to maintain the current at the output as a sinusoid, but to control the current out of the generator to be sinusoidal. Therefore, the current out of the power processor in this third mode of operation can be very non-linear.

Control of the present invention involves both logic functions and analog functions. The ideal control would operate extremely quickly and extremely accurately. Many of the computations must be done using analog circuitry. For example, taking the difference between actual current or voltage waveforms and desired current or voltage waveforms and filtering them to achieve frequency selective gains often is best accomplished using analog computations. Digital to analog converters (D/A) as used in the present invention often have a gain input that may be used to multiply one analog signal with a desired digital value, thereby accomplishing an analog multiplication. The comparison of a desired signal to a periodic triangle-shaped voltage waveform is best done using analog circuitry as described in the preferred embodiment of this invention. The precise control of the time that each electronic switch is closed is best accomplished using analog circuitry. On the other hand, the storage of the values in a reference waveform, such as a sinusoidal reference or some other desired reference waveform, for use with a D/A, is often best accomplished using digital techniques such as storage on a programmable read-only memory, or storage using logic gates in an application-specific integrated circuit (ASIC), as in a preferred embodiment, or other programmable logic array. The control of the mode of operation of the power processor is usually best accomplished using digital techniques.

The skilled artisan will recognize that the logic aspects of the present invention may be implemented by various integrated circuits. The preferred embodiment utilizes programmable array logic chips and digital to analog converters. However, many possible combinations of digital signal processing chips, microprocessor chips, digital to analog and analog to digital convertors, and memory chips could be used for the logic. Furthermore, relatively simple or primitive integrated circuit chips (ICs) may be used to reduce the overall complexity of the system. Various other standard functions of an IC may be implemented into the processor of the present invention, such as current limit functions (which could constrain the maximum power at the output of the power processor to prevent failure), slow turn-on logic, safe turn-off logic, and other safety features.

Notably, however, the present invention does not contain logic statements which imply that if the system is in battery supply mode, then no current is supplied by the system, and if the system is in the inverter mode, then no current is allowed back into the battery. These typical logic statements do not appear in the logic of the present invention.

FIG. 14A shows a simplified block diagram of the present invention operating in parallel with a generator. FIGS. 14B–14G show several plots of idealized performance of the power processor operating in the parallel mode. FIG. 14B shows a sinusoidal current at the rated output load. In these plots, the load may represent a resistor in parallel with a highly non-linear load. The non-linear load current is shown in FIG. 14C. The non-linear load draws a current of zero for small voltage levels and draws a current proportional to voltage above a certain threshold. The harmonic currents exceed the fundamental in amplitude. The non-linear load current thus generated would be worse than what can be expected in practical applications such as computers, refrigerators, or other household loads.

By way of example, the power processor is assumed to be operating in the inverter mode initially. The load is then switched to the diesel generator. The transfer occurs gradually and the current at the output of the generator is maintained to be sinusoidal and in phase with the generator voltage. The amplitude of the current is gradually increased to the full load current. FIG. 14D shows the generator current at the instant that the current reaches 25% of its rated output. FIG. 14E shows the power processor current at that instant. Thus, the power processor is charging the battery during part of each cycle and is delivering power to the load during other parts of each cycle.

The amplitude of the generator output current is allowed to gradually increase to 100% of the rated output as shown in FIG. 14F. At this point, for this load, the power processor has become strictly a battery charger, maintaining a sinusoidal current at the output of the generator. The power processor current is shown in FIG. 14G. Thus, the power processor is acting as a current controller when it is in parallel with the generator. The power processor transitions from being a current source to being a current sink, as illustrated in FIG. 14G. In between, as shown in FIG. 14E, the power processor is a current source during part of each cycle, and a current sink during other parts of each cycle. For other load current waveforms, the power processor may supply power during part of the cycle even in the equivalent of FIG. 14G, for example, if the above-described fourth optimization strategy is adopted.

Simulations were conducted using standard models for a diesel generator and its voltage and frequency control systems. The phase-locked loop was assumed to operate with negligible error. Solutions of non-linear differential equations were implemented using techniques described in the literature. A sampled data system was assumed with a sampling rate of either 96 or 192 samples per cycle of the waveforms. A frequency of 60 Hz was assumed.

Figure 15:
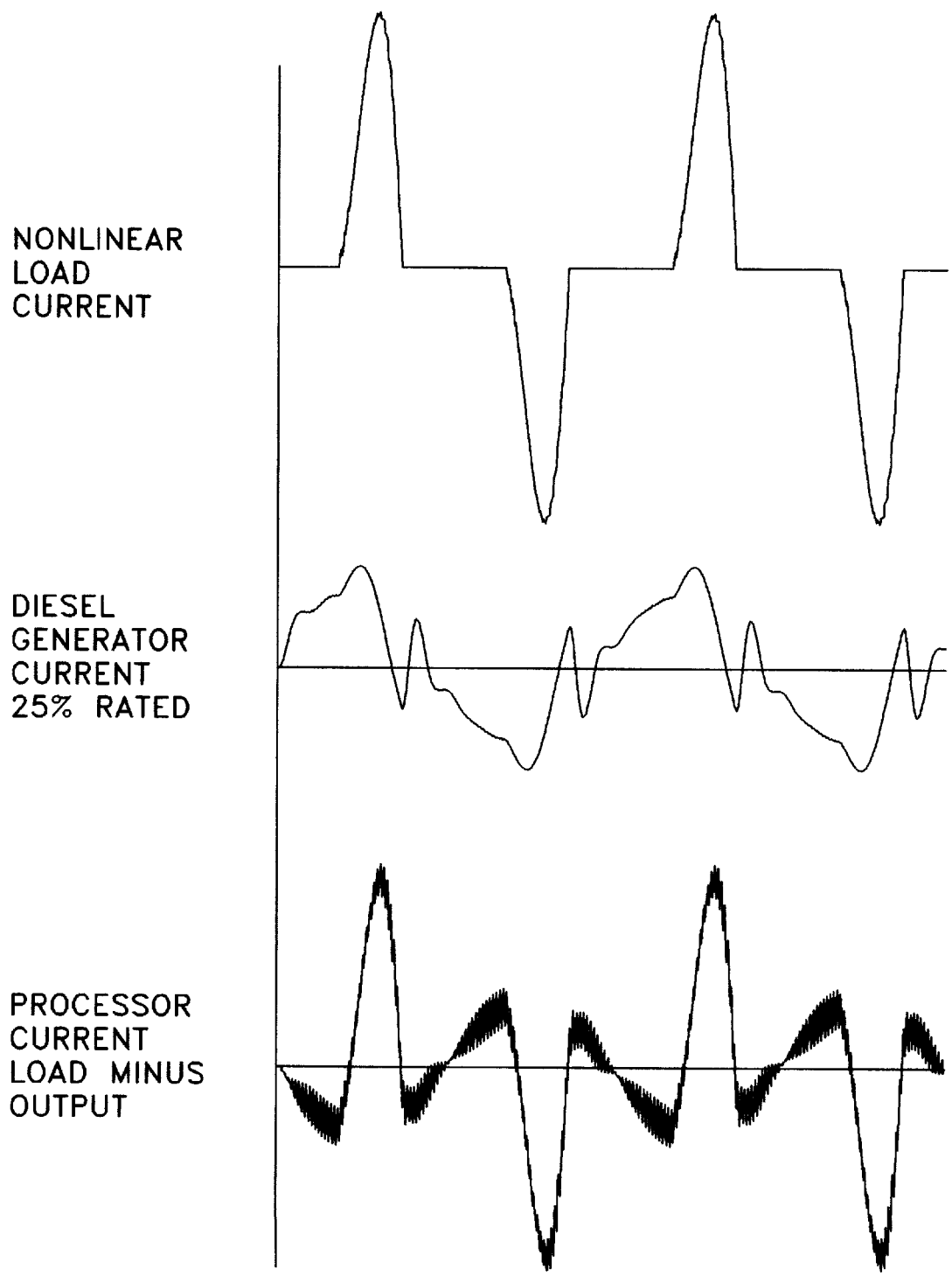
FIGS. 15–18 illustrate typical simulation results of the performance of the power processor according to the present invention.
Figure 16:
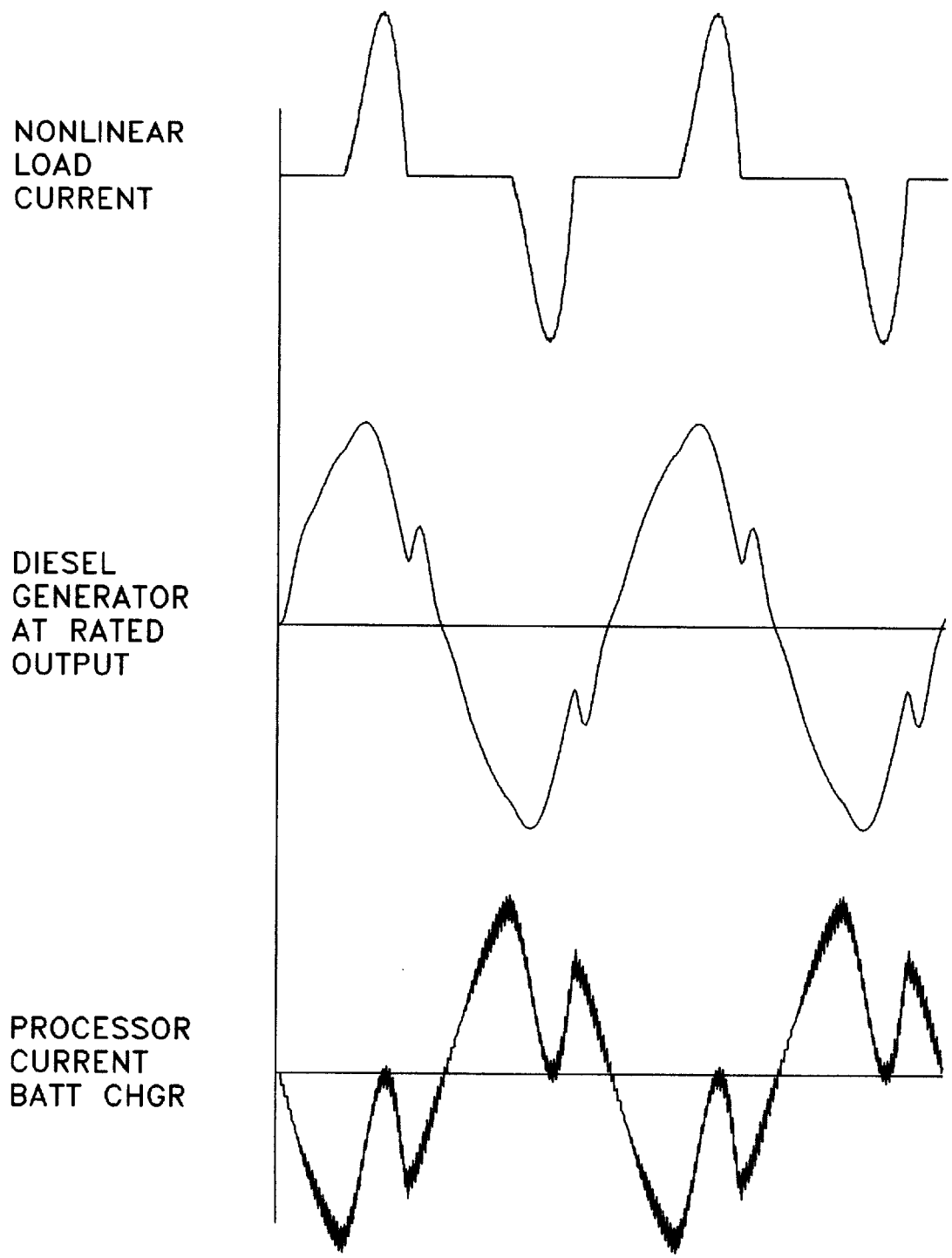
Figure 17:
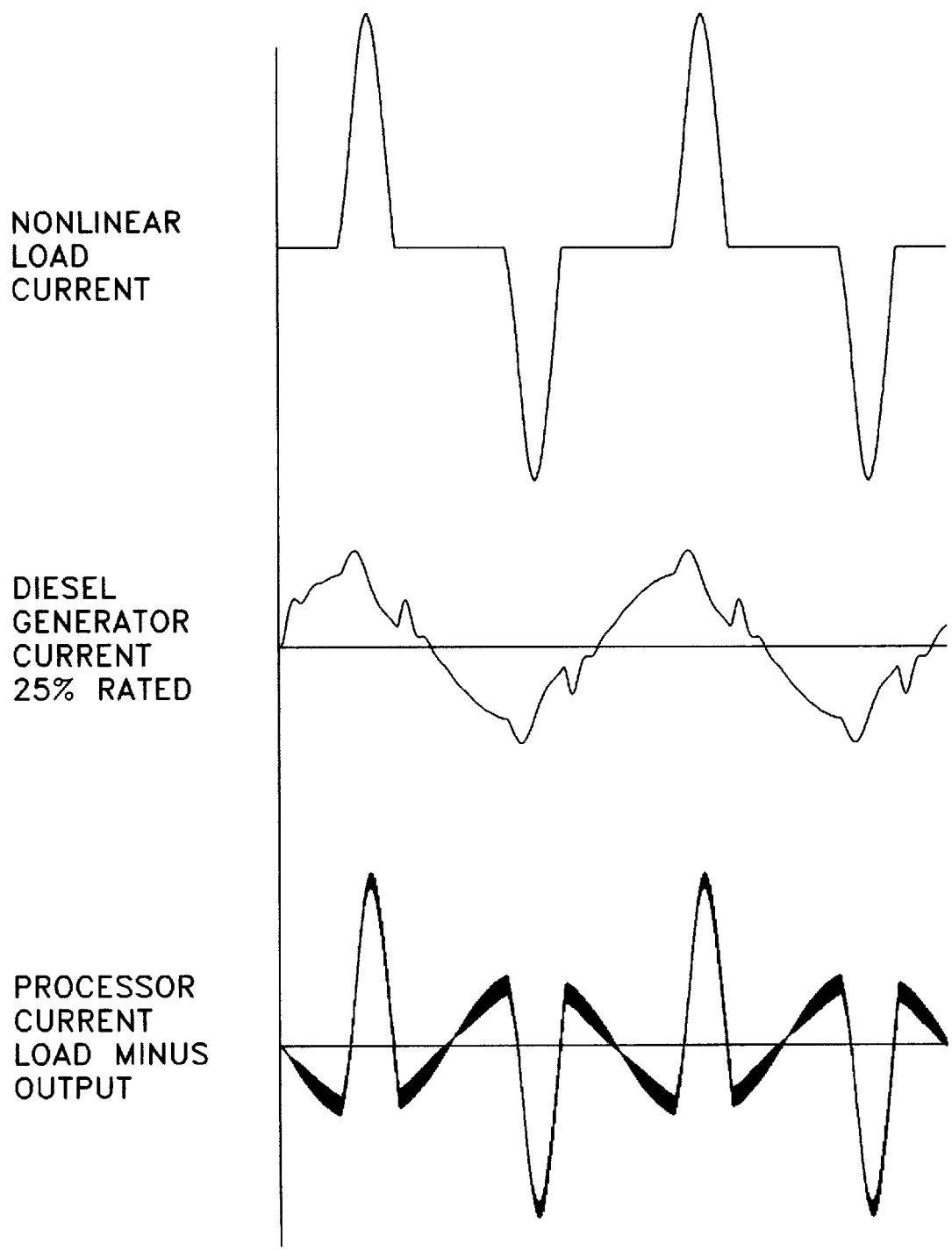
Figure 18:
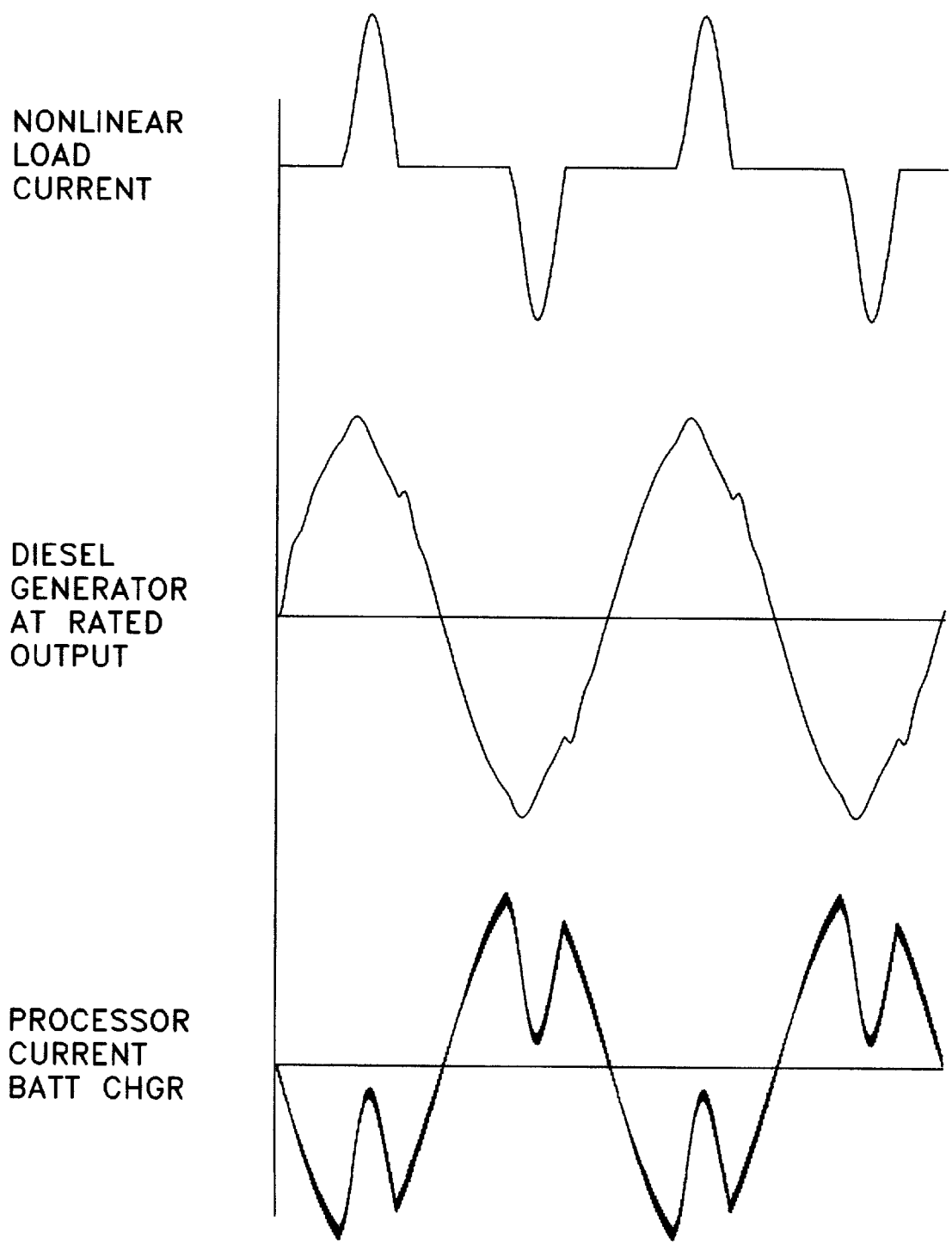

FIGS. 15–18 illustrate results of typical simulations. The load current was a nonlinear function of the load voltage, similar to that shown in FIG. 14C. The simulation results were referenced to the theoretically perfect performance as shown in FIGS. 14A–G. FIGS. 17 and 18 illustrate a significant improvement in performance by doubling the sampling rate from 96 samples per cycle of the 60 hertz, corresponding to FIGS. 15 and 16, to 192 samples per cycle.

FIG. 15 shows the results of a simulation corresponding to 25% load current with 96 samples per cycle. Three plots are shown corresponding to the non-linear load current of FIG. 14C, the diesel generator current of FIG. 14D, and the power processor current of 14E. Thus, the simulations verify that the power processor acts as a battery charger during part of each cycle and supplies power to the load during the remaining part of each cycle. The ripple on the power processor current in FIG. 15 is due to the sampled data approach with a uniform sampling frequency and pulse widths computed at the sampling rate. Most of this ripple would be absorbed by a capacitor at the output of the power processor. The diesel current in FIG. 15 has significantly lower harmonics than the non-linear load current.

FIG. 16 shows the output of the simulation at 100% load current with 96 samples per cycle. The plots correspond to FIGS. 14C, 14F and 14G respectively. The diesel current in this simulation again has significantly lower harmonics than the load. The deviations from a perfect sinusoid are due to the necessary compromises that have been made in implementing the theoretically optimum system with a finite sampling rate and potentially noisy measurements.

FIG. 17 and 18 show the outputs of the simulations of FIGS. 15 and 16, the only difference being the sampling rate of the sampled data control system which has been increased to 192 samples per cycle. The diesel current waveforms are closer to sinusoidal than in FIGS. 15 and 16, and the ripple on the power processor current has been decreased in amplitude, and increased in frequency, thereby making the current easier to filter. The diesel current in FIG. 18 has 10% total harmonic distortion (THD) while the non-linear load current has greater than 100% THD. This decrease is significant, especially considering that losses due to harmonic content increase as the square of the THD. Thus, the losses due to THD have been decreased by a factor of over 100.

The diesel generator in the simulations was rated at 50 kW. In FIG. 16, the diesel power is 49.2 kW and 30.0 kW is delivered to the battery. However, for the simulation in FIG. 18, the diesel power was increased to 49.5 kW and the power delivered to the battery was increased to 33.7 kW. Thus, either the 96 or 192 samples per cycle achieved the goal of having the load on the diesel near the maximum 50 kW. The 192 samples per cycle was able to achieve more power delivered to the battery by decreasing switching losses and maintaining a more nearly sinusoidal diesel current.

Notably, the power processor reverses twice during each half cycle from taking in power for battery charging to delivering power to the load. The diesel-generator current approaches a sinewave, even with the peak of the non-linear load current at 2.8 times the peak of the 25% of rated load current.

Thus, the power processor reduces the fuel consumption of the diesel-generator to its minimum by presenting itself as the perfect electrical load to the generator.

Furthermore, the power processor may fulfill an important control function in remote locations, such as remote village applications, of photovoltaics, by optimizing the use of various sources of energy, such a photovoltaic, diesel, and battery, by minimizing diesel fuel consumption and by using the maximum power available from the photovoltaic array. The application of photovoltaic energy at remote locations where reliability of supply requires a diesel-generator will thus be less costly to operate by reducing the run time of the diesel-generator. The numerous benefits include longer time between maintenance for the diesel engine and better power quality from the generator.

In the inverter mode of operation, turn-on into an unknown load requires a rapid but controlled increase in voltage to the load to avoid transformer flux saturation and to charge computer grade capacitors over several cycles. Such control may be achieved by digital techniques.

The present invention may include the application of different switching patterns to two or more inverter bridges. Adaptation of the controller for high power applications where more than one inverter is required per phase will increase in efficiency, reduce harmonic content and double the speed of response without an increase in cost, since relative to the cost of operating the two inverters with a completely synchronized controller, the additional cost of using different switching patterns as described herein would be negligible.

Figure 19:
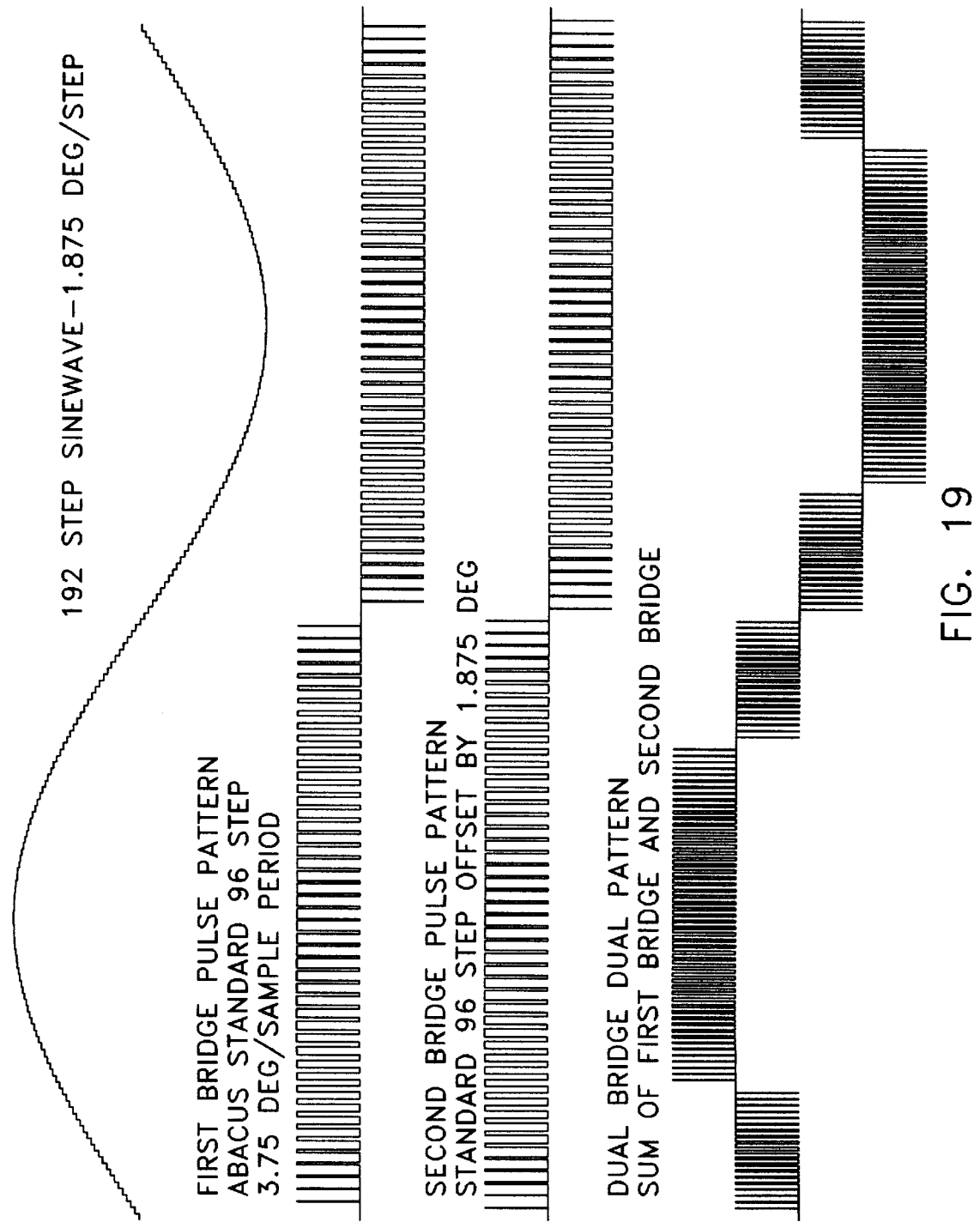
FIG. 19 illustrates the application of dual bridge wave shapes.

FIG. 19 illustrates the application of dual bridge wave shapes. The first wave shape in FIG. 19 is a 192 step sinewave reference, which is compared to the output in order to generate an error signal. Each bridge acts on every other pulse, and the combination of the two bridges are added by the series connection of the bridge output transformer secondary windings.

The second wave shape in FIG. 19 is the first bridge pulse pattern with 96 steps per cycle. The third wave shape is the second bridge pattern, which is displaced by 1.875° from the first bridge wave shape. The fourth wave shape is the linear addition of the first bridge and second bridge pulse patterns. In the individual bridge patterns, three voltage levels exist. For the sum of bridge pulse patterns, five voltage levels exist.

In a preferred embodiment, the sample-data controllers uses pulses that grow wider from the center, so after the individual pulse widths exceed 50% of each period, one of the two bridges is positive (negative in the negative half-cycle) at all times. Thus, the 5 voltage levels are created, the harmonic content is reduced, efficiency is increased because each bridge is switching at only half the sample frequency, and after the non-recurring design costs are covered, the cost will be decreased because of the reduced filter requirements for the five step wave shape. The dual pattern controller may be programmed into an ASIC.

Figure 20:
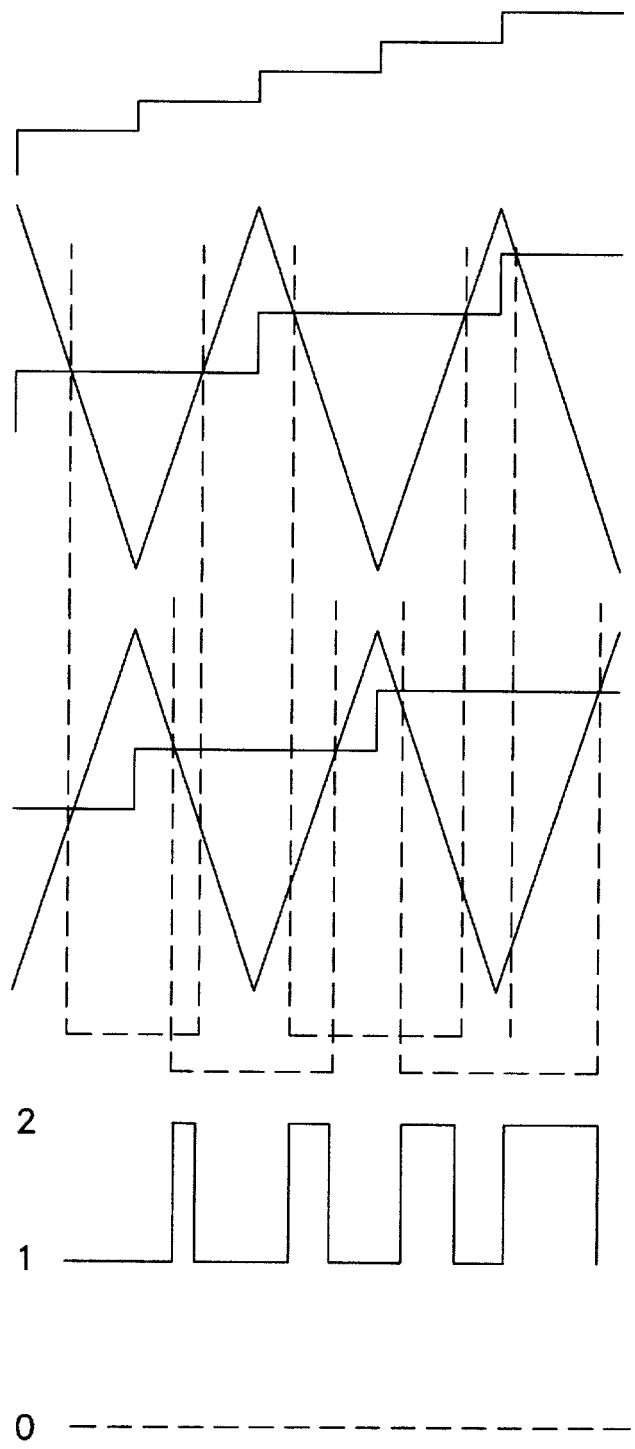
FIG. 20 illustrates another series of plots that demonstrate dual bridge pulse generation according to the present invention.

FIG. 20 illustrates another series of plots that demonstrate dual bridge pulse generation. The first plot represents an error amplifier output corresponding to 192 samples per cycle. The second plot represents a first bridge pulse generator at 96 samples per cycle, while the third plot represents a second bridge pulse generator at 96 samples per cycle. The fourth plot shows the sum of the first bridge and second bridge pulses.

Figure 21:
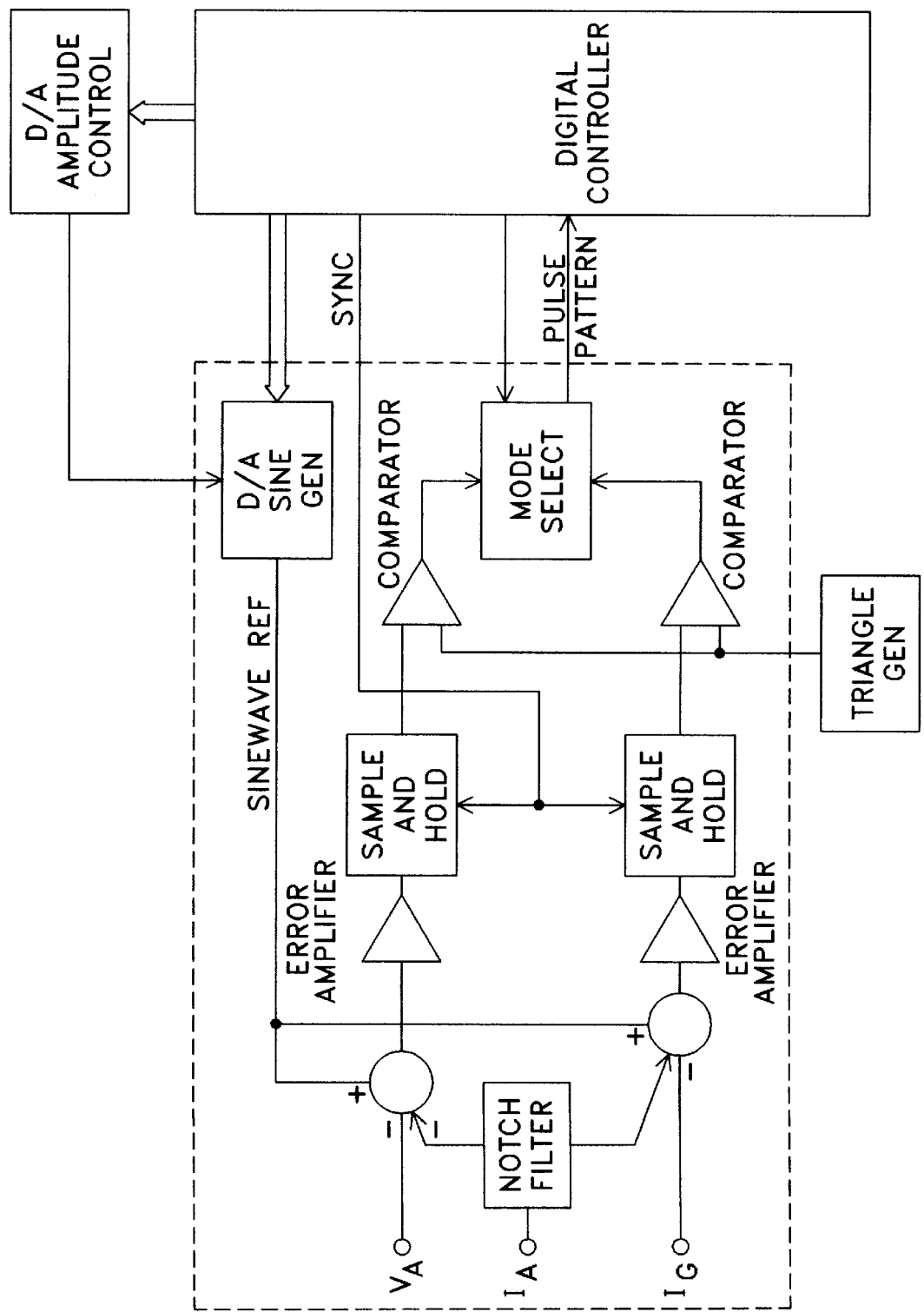
FIG. 21 illustrates a phase circuit according to one embodiment of the present invention.

FIG. 21 illustrates a phase circuit according to one embodiment of the present invention. Sampled voltage $V_A$ corresponding to the load voltage on phase A, and sampled current $I_G$ corresponding to the diesel current on phase A are each fed into a respective summing junction. The voltage $V_A$ is added to a filtered version of the current $I_A$, which corresponds to the current in phase A of the inverter, and to a reference sinewave signal that is generated by a digital to analog convertor (D/A). The D/A sinewave generator derives its amplitude from the output of a D/A amplitude controller whose input is controlled by the digital controller, and receives its digital inputs and timing information from the digital controller. The digital input to the D/A controller is obtained from the digital controller so as to achieve the desired objective in the current mode of operation. For example, in a current control mode where it is desired to keep the diesel current $I_G$ sinusoidal at a desired level, the digital input to the D/A amplitude controller is chosen to correspond to that desired amplitude. For situations where this current should ramp up or down to a desired level, the digital controller merely steps the digital inputs to the D/A amplitude controller through the desired sequence of levels, remaining at each level for a desired amount of time. In a preferred embodiment, an 8-bit D/A is used with the largest possible value corresponding to the rating of the diesel. As a second example of how the D/A amplitude controller is used, in the inverter mode the voltage at the output of the inverter, which equals the load voltage $v_A$, is controlled to be a sinusoid. In this case, the digital input to the D/A amplitude controller is chosen to correspond to that desired voltage level.

The digital controller also supplies the synchronization signals to the sample and holds and controls the mode of the mode select box. The sample and holds produce output voltage levels that are held constant for one sampling interval ($\frac{1}{96}$ or $\frac{1}{192}$ of a cycle for the preferred embodiment) at values equal to the voltages at their respective inputs at the time they receive the synchronizing signal from the digital controller. The inputs to the sample and holds equal the outputs of respective error amplifiers whose inputs are the outputs of the respective summing junctions. The outputs of the sample and holds are compared using comparators to a triangle wave that is synchronized through the digital controller with the sampling times. The width of one triangle wave is equal to one sampling interval. The outputs of the comparators are then used as input to a mode select circuit, whose input from the digital controller determines whether the power processor should use voltage control (as in the inverter mode) or current control (as in the battery charge mode and in the parallel operation mode). In the voltage control mode, the output of the upper sample and hold (that corresponding to the summing junction that has $v_A$ as input) is used to control the switches in the power stage. In the current mode, the output of the lower sample and hold (that corresponding to the summing junction whose input is $I_G$), is used to control the switches in the power stage.

FIG. 21 shows several features that are unique to the present invention. One feature is the sensing of the current $I_G$; previously known techniques measure and control the output of a power processor, not the current out of a generator as in the preferred embodiment of the present invention. Thus, the sensing of the current $I_G$, and the associated error amplifier and associated control techniques are distinguishing features of the present invention. A second feature of the present invention is the use of the D/A amplitude controller. This D/A amplitude controller is used to control the amplitude of the reference sinewave in a preferred embodiment. Thus, the D/A sinewave generator acts as a multiplier of two signals produced by the digital controller. This multiplication and the use of the D/A amplitude controller constitute a distinguishing feature of the present invention. The use of this feature is crucial to being able to slowly transfer between the inverter mode and a parallel operation mode without causing transients in the voltage or frequency of a generator such as a diesel generator.

Figure 22:
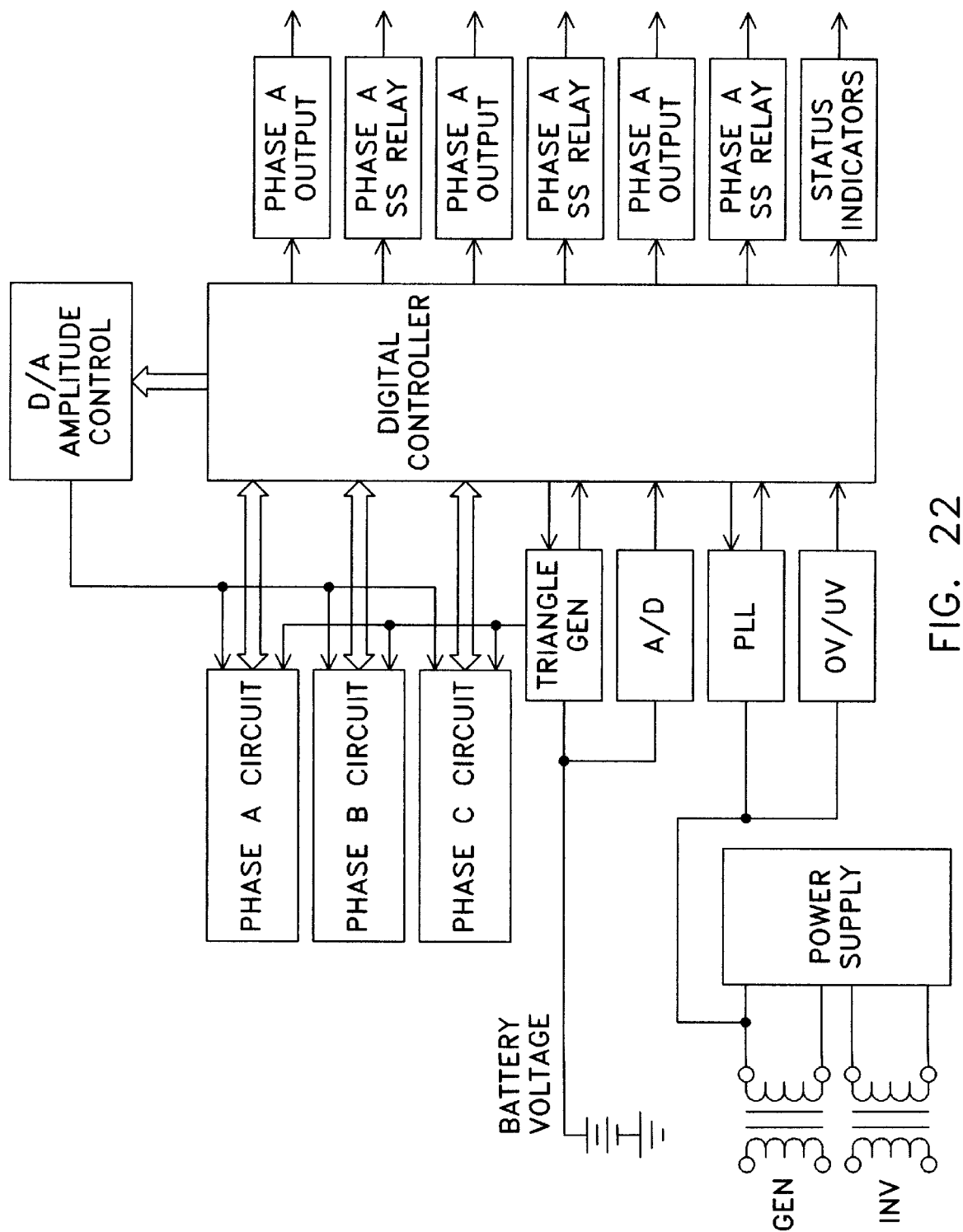
FIG. 22 illustrates one embodiment of the control block diagram for managing a three phase system according to the present invention.

FIG. 22 illustrates one embodiment of the control block diagram for managing a three phase system. Each phase circuit corresponds to a phase circuit as illustrated in FIG. 21. The generator voltage and the inverter voltage are sensed through transformers and used as inputs to a power supply stage to provide power to the rest of the electronic circuitry. The generator voltage is input to a phase-lock loop (PLL) means and communicates with the digital controller. Through this phase lock loop circuitry, desired waveforms may be synchronized with the generator voltage. An over/under voltage indicator also taps into the same measurement of the generator voltage and supplies information to the digital controller. The battery voltage is sensed by an analog to digital converter (A/D) circuit, the output of which is input to the digital controller. One triangle wave generator is used in all of the phase circuits. It is synchronized with the diesel generator by the digital controller. The digital controller also provides the signals to control the individual switches in the power stages labeled Phase A Output, Phase B Output, and Phase C Output, the signals to one or more status indicators, and the signals to solid state relays that control the connections to the individual phases. In general, in standard operations, with no out of tolerance conditions or other conditions that preempt normal operation in effect, the pulse pattern outputs of the mode select circuitry in the individual phases are directly applied to the output circuits by the digital controller.

Figure 23:
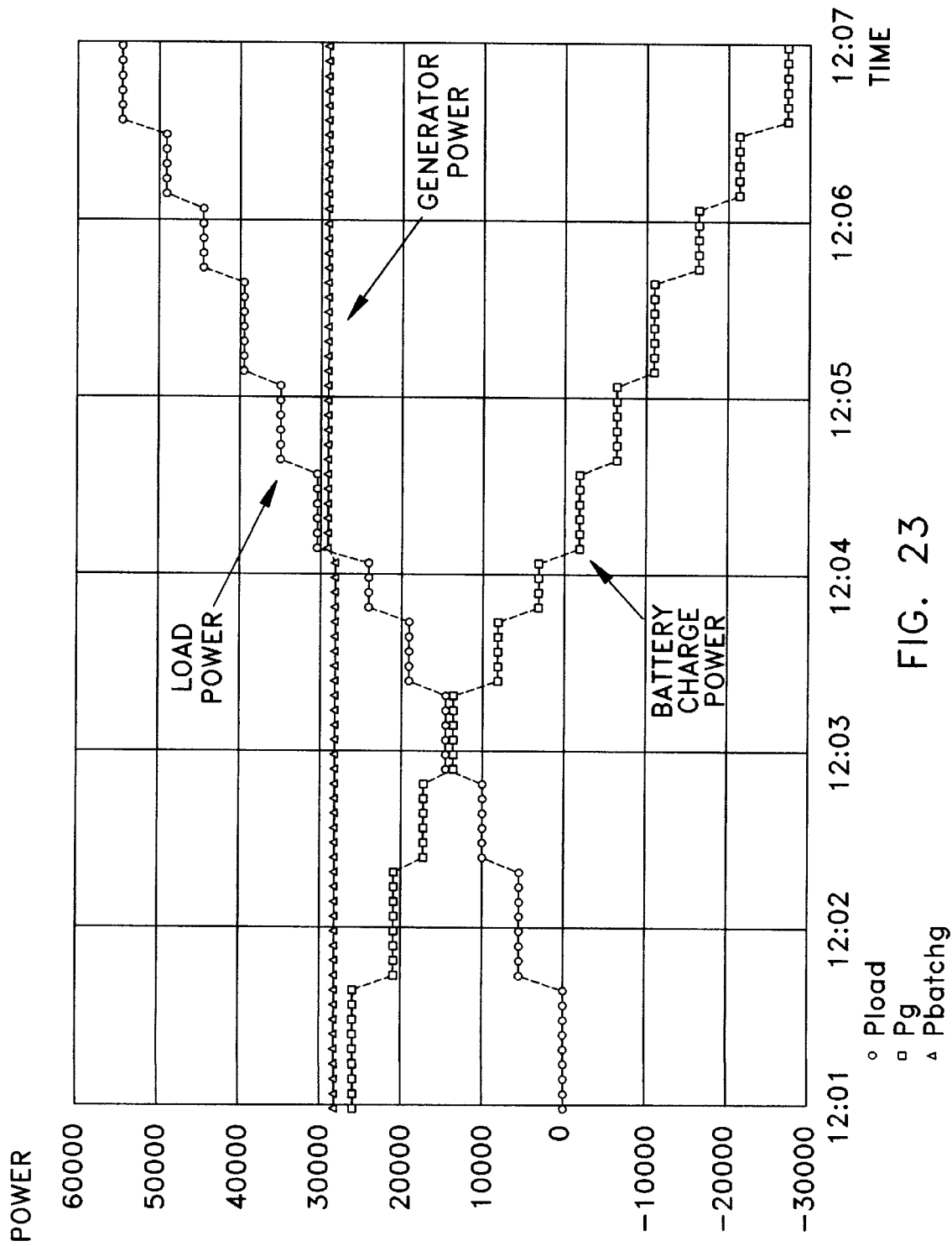
FIGS. 23–25 show experimental test results of the power processor according to the present invention operating in parallel with a diesel generator.
Figure 24:
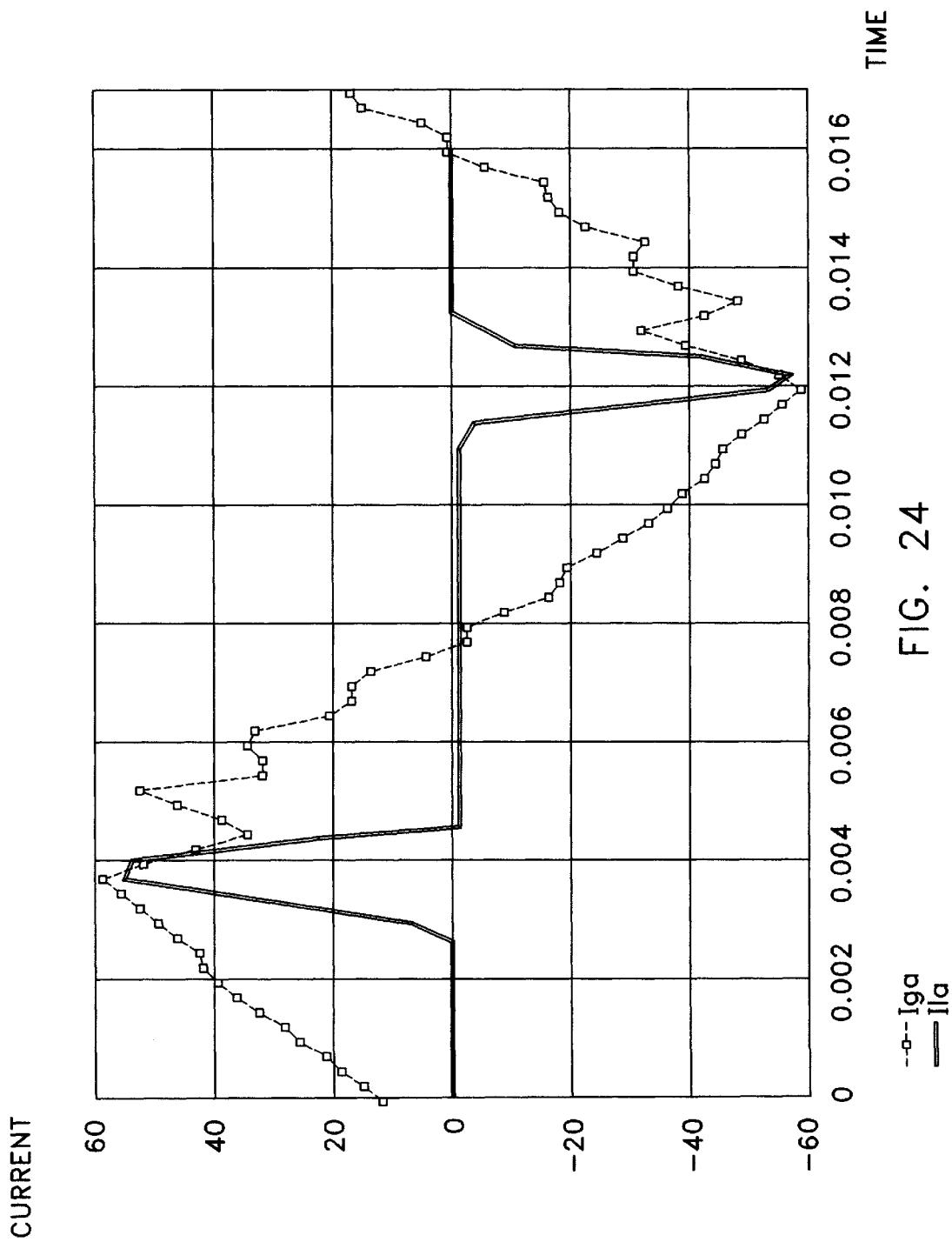
Figure 25:
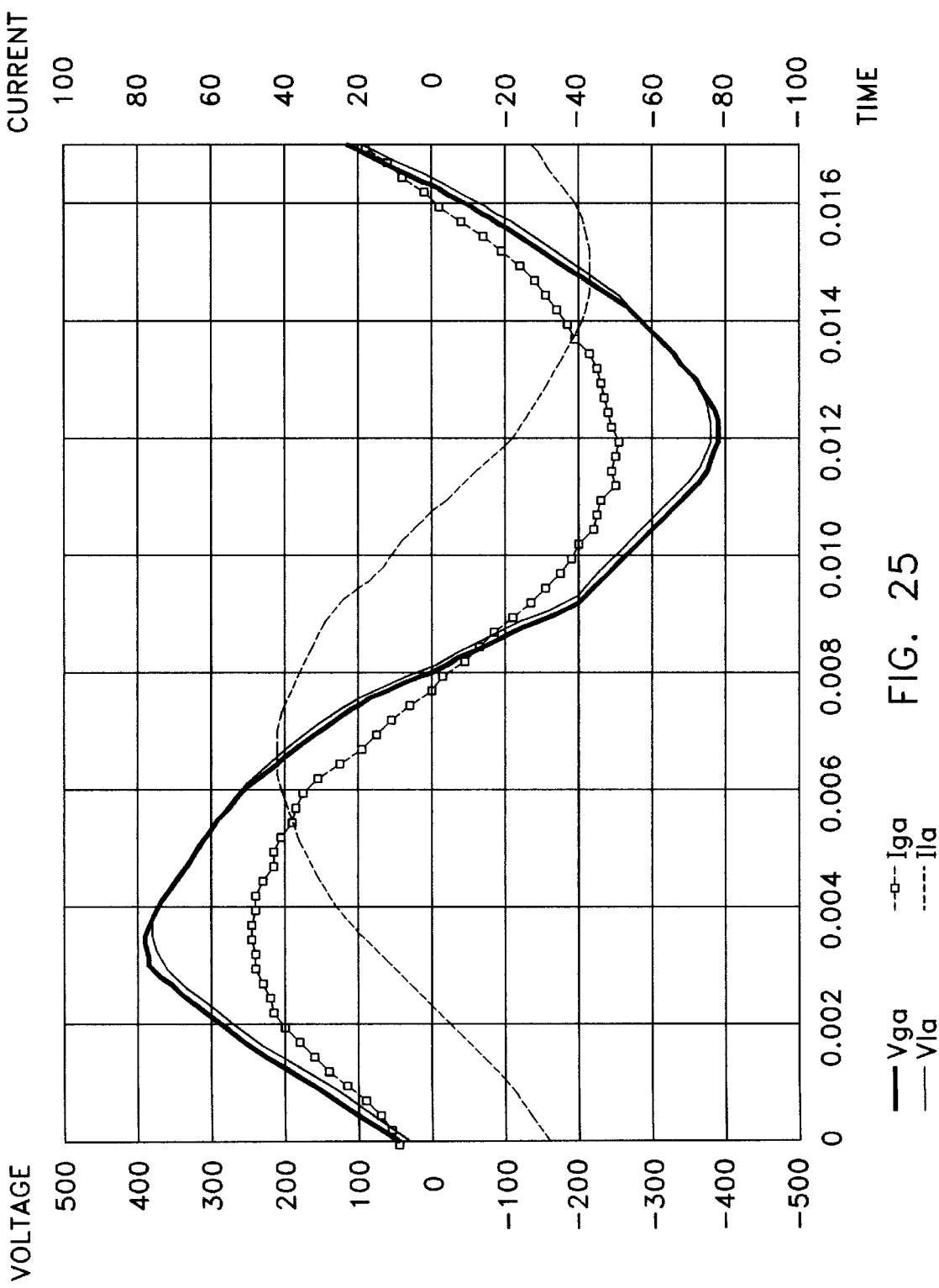

FIGS. 23–25 show experimental test results of the power processor according to the present invention operating in parallel with a diesel generator.

FIG. 22 highlights additional unique features of the present invention. One distinguishing feature is in the implementation of the digital controller to pass the pulse patterns from the output of the mode select box in the phase circuit to the output circuits. This implementation is accomplished by using logic circuitry which are embedded in an ASIC in a preferred embodiment, computing logical "AND" computations with status indicators so that the analog precision achieved through the comparison with the triangle waveforms in FIG. 21 is also achieved at the output circuits that control the operation of the electronic switches. A second distinguishing feature is also implemented within the digital controller. This feature allows the power processor to change between delivering power to the load and charging the battery multiple times within any given period of the voltage waveforms. This is allowed in order to accomplish whatever optimization strategy is desired, such as maintaining the current at the output of the diesel to be a sinewave in phase with the voltage. In other known devices, the current in the power processor was controlled to be a sinewave or to have some desired shape, and thus those previous devices allowed power flow in one direction only during any given period, such as by the presence of diodes or other electrical devices or circuitry or logic which prevents current flow in two directions. That is, previous devices were not equipped to handle current flow out in a battery charge mode.

FIG. 23 shows power flow over a seven minute time frame. The load power was stepped up in 5 kW increments, starting from no load, i.e. 0 kW, up to 1.83 times the full load rating of the generator, i.e. 55 kW.

Initially, the power processor delivered the difference between the rating of the generator (30 kW) and the load to the battery. As the load increased, the power processor moved through a stage of delivering no power to the battery to a stage where the processor operated in parallel with the generator, thereby supplying the difference between the demand and the generator power.

FIG. 24 shows the generator current and the load current on phase A, wherein a non-linear load existed on phase A only. The load current is thus highly non-linear on the plot. The power processor forced the generator current to be more nearly sinusoidal.

FIG. 25 shows the generator voltage, the load voltage, the generator current, and the load current for a load with a 0.5 power factor. The generator voltage and the load voltage were nearly the same, as they should be. The power processor was operating to optimize the current waveform produced by the generator. This current was kept in phase with the generator voltage, with RMS value equal to the rating of the generator. The difference between the generator current and the load current was the power processor current. Clearly, the power processor consumed power during part of each cycle and supplies power from the battery for the remainder of each cycle.

FIGS. 23–25 thus illustrate the power processor of the present invention operating as predicted.

It can be appreciated that one of the main features of an embodiment of the present invention is the ability to operate in parallel with a generator, in addition to operating in an inverter mode and in a battery charge mode. With this ability to operate in either of these three modes, the present invention may referred to as a trimode power processor or a trimode. Furthermore, the inverter mode may correspond to a voltage control mode, wherein the power processor or trimode switches to voltage control mode (inverter mode) when operating without the presence of the diesel generator. When operating in parallel with the diesel or in battery charge mode, the power processor or trimode controls the current out of the trimode rather than the voltage. Thus, in two of the three modes, the trimode may use current control.

The controller in the power processor according to the present invention exercises control on several levels and in various aspects. The controller monitors the overall state of the unit or system. If inputs or outputs go too far out of tolerance, the controller may monitor and safely shut down the system. During normal operation, one level of control determines the mode or the goal of the current operation. This level of control determines in which mode the processor should be operating, such as battery charge mode, inverter mode, parallel operation mode, optimization of some criterion such as maximizing the use of the renewable energy source or maintaining the current out of the generator as close to a sinusoid a possible, etc. The controller also provides a fine level of control which occurs on a relatively faster time scale. Thus, the mode of operation typically does not change often, while the finer control changes occur on the order of a tenth of a millisecond, for example. The controller thus determines positions of switches, e.g. turning transistors on and off, in order to achieve desired design goals.

It will thus be seen that the objects set forth above, among those elucidated in, or made apparent from, the preceding description, are efficiently attained, and since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all the generic and specific features of the invention herein described and all statements of the scope of the invention which, as a matter of language, might be said to fall therebetween.

We claim:

1. An AC power processor for delivering power to a load in coordination with an energy storage device and an AC power source comprising:

an electronic power control means, connecting said energy storage device and said alternating current power source, for selectively directing power from the AC power source to the energy storage device and from the energy storage device to the load, on a subcyclic basis with respect to the AC power source;

a single bridge including a plurality of switching elements capable of AC-DC and DC-AC conversions, wherein each switching element is capable of being positioned in an on state or off state;

wherein said processor is capable of operating in at least three modes including:

a first mode wherein power is supplied to the load only by said power processor;

a second mode wherein the AC power source supplies power to both the load and said power processor; and a third mode wherein both the AC power source and said power processor supply power to the load in parallel;

whereby said processor is capable of adjusting the energy stored in the energy storage device.

2. The processor according claim 1 wherein said processor is adapted to control the power on a per-phase basis.

3. An AC power processor, for use with a DC voltage source, for delivering power to a load, in parallel and in coordination with an AC voltage source, the processor comprising means for controlling the flow of electrical energy into and out of said DC voltage source, including:

a plurality of switching elements connected to the DC voltage source, wherein the switching elements are capable of converting an AC current from the AC voltage source to DC current and directing the DC current to the DC voltage source, and wherein the switching elements are capable of converting a DC current from the DC voltage source into an AC current and directing the AC current to the load;

at least one inductive element interposed between said switching elements and said AC voltage source;

means for determining a plurality of switch configurations on a subcyclic basis with respect to the AC power source and based on a desired optimization strategy; and means for switching the switching elements;

wherein the processor is capable of operating in at least three modes including:

an inverter mode wherein AC current is supplied to the load only by said power processor;

a charge-supply mode wherein the AC power source supplies current to the load and said power processor; and a parallel supply mode wherein both the AC power source and the power processor supply current to the load in parallel.

4. A multi-modal power supply system for delivering power to a load in coordination with an AC power source and a DC voltage source, the system comprising:

at least one bridge including a plurality of switching elements capable of AC-DC and DC-AC conversions, wherein each switching element is capable of being positioned in an on state or an off state;

at least one means for connecting said bridge to the DC voltage source;

at least one means for interconnecting said bridge, the AC power source and the load, including:

a bridge-AC connection means for connecting said bridge to the AC voltage source;

a parallel connection means for connecting the load to said bridge-AC connection means at parallel points; and an inductive means disposed between said bridge and the parallel points;

at least one means for sensing the voltage and current of the DC voltage source;

at least one means for sensing the voltage and current of the AC power source;

at least one means for sensing the voltage and current between said bridge and said inductive means; and at least one control means for changing the positions of said plurality of switching elements on a subcyclic basis based on the sensed voltages and currents;

wherein said plurality of switching elements is capable of converting the AC current from the AC voltage source to DC current, and directing the DC current to the DC voltage source;

wherein said plurality of switching elements is capable of converting the DC current from the DC voltage source into AC current and directing the AC current to the load;

wherein said plurality of switching elements are capable of being positioned into at least four configurations for each phase, including:

a first configuration wherein the DC voltage source supplies a positive polarity voltage to the load across said inductive means, a second configuration wherein the DC voltage source supplies a negative polarity voltage to the load across said inductive means, a third configuration wherein said inductive means supplies a positive polarity voltage to the load, and a fourth configuration wherein said inductive means supplies a negative polarity voltage to the load; and wherein said system is capable of operating in at least three modes including:

an inverter mode wherein AC current is supplied to the load by either the DC voltage source or said inductive means, or both;

a charge-supply mode wherein the AC power source supplies power to the load, said inductive means, or said DC voltage source, or a combination thereof; and a parallel supply mode wherein the AC power source and at least one of said inductive means or the DC voltage source, or both, supply power to the load in parallel.

5. The system according claim 4 wherein said system is adapted for multiphase operation and includes, for each phase, a respective said bridge, said bridge-to-DC voltage source connecting means, said bridge-AC power source-load interconnecting means, said DC voltage source sensing means, said AC power source sensing means, and said means for sensing voltage and current between said bridge and said inductive means.

6. The system according to claim 4 further comprising a switching means disposed between the AC voltage source and the bridge for selectively disconnecting the AC voltage source.

7. The system according to claim 4 wherein said control means changes the positions of said plurality of switching elements on a subcyclic basis based on the sensed voltages and currents according to an optimization strategy.

8. The system according to claim 7 wherein said optimization strategy further comprises maintaining in phase the current and voltage of the AC power source during the charge-supply mode or the parallel supply mode.

9. The system according to claim 7 wherein said system further comprises a means for generating a reference waveform in phase with the voltage of the AC voltage source.

10. The system according to claim 9 wherein said optimization strategy further comprises means for minimizing the error between the AC voltage source current and the in-phase reference waveform.

11. The system according to claim 10 wherein said reference waveform is sinusoidal.

12. The system according to claim 10 wherein said reference waveform is triangular.

13. The system according to claim 10 wherein said reference waveform is trapezoidal.

14. The system according to claim 10 wherein the amplitude of said reference waveform corresponds to the maximum deliverable power of the AC voltage source.

15. The system according to claim 7 wherein said system is capable of optimizing the current waveform of the AC voltage source during the parallel supply mode by supplying power or withdrawing power from said parallel connection means on a subcyclic basis.

16. The system according to claim 15 wherein said system is capable of optimizing the current waveform of the AC power source during the charge-supply mode or the parallel supply mode by supplying power or withdrawing power from said parallel connection means on a subcyclic basis.

17. The system according to claim 16 wherein said system further comprises a means for generating a reference waveform in phase with the voltage of the AC power source.

18. The system according to claim 17 wherein said optimization strategy further comprises minimizing the mean integrated square-error between the AC power source current and the in-phase reference waveform.

19. The system according to claim 18 wherein said reference waveform is sinusoidal.

20. The system according to claim 18 wherein said reference waveform is triangular.

21. The system according to claim 18 wherein said reference waveform is trapezoidal.

22. The system according to claim 18 wherein the amplitude of said reference waveform corresponds to the maximum deliverable power of the AC power source.

23. The system according to claim 4 wherein said system further comprises means for determining the period of the AC power source; and wherein said control means further comprises:

means for dividing the period into equal time intervals; and means for determining the durations of the on and off states of each switching element for each equal time interval.

24. An uninterruptible power supply system for delivering power to a load comprising:

input lines for receiving an AC power input having a waveform with positive and negative half cycles;

output lines for providing an AC power output to the load;

a battery capable of providing a DC output voltage;

a power transformer having a primary coupled to a secondary, the secondary being connected across the output lines;

an inverter connected to the primary of the power transformer and to the battery, including switching devices connected in a bridge configuration which are controllable to convert DC voltage power from the battery to AC voltage power at the primary of the power transformer and to supply the battery with power from the primary, the switching devices being responsive to control signals to switch between on and off states; and control means, connected to the switching devices in the inverter, for controlling the power into and out of the inverter on a subcyclic basis relative to the AC power input, including:

means for sensing the battery voltage;

means for determining the polarity of the AC input;

means for determining a desired AC power output current;

means for generating a sinusoidal reference signal having an amplitude substantially equal to the desired output current;

means for comparing the sinusoidal reference signal with the output current to yield a current error signal; and means for generating a pulse width proportional to the amplitude of the current error signal for modulating the inverter switching devices;

wherein the switching devices are capable of assuming at least four pairs of configurations based upon the polarity of the error signal and the polarity of the AC input voltage, wherein the switches are pulsed on into a first configuration of each pair for the duration of each pulse width and pulsed off into a second configuration of each pair;

wherein said system is capable of operating in one of a plurality of states, including:

a first power supply state in which the battery is capable of supplying power to the load through the inverter, said state corresponding to the first configuration when the polarities of the error signal and the AC input voltage coincide;

a second power supply state in which an effective inductance, which includes the effective leakage inductances of the primary and secondary of the transformer, is capable of supplying power to the load, said state corresponding to the second configuration when the polarities of the error signal and the AC input voltage coincide;

a first power consumption state in which the AC power input is capable of charging the battery through the inverter, said state corresponding to the first configuration when the polarities of the error signal and the AC input voltage differ; and a second power consumption state in which the AC power input is capable of supplying power to the effective inductance, said state corresponding to the second configuration when the polarities of the error signal and the AC input voltage differ;

wherein the system is capable of supplying power to the load from the battery and the AC power input simultaneously.

25. The system according to claim 24 wherein said system further comprises means for maintaining the AC input current in phase with the AC input voltage.

26. The system according to claim 25 wherein said system further comprises at least one switch means for detaching the AC power input from said system.

27. The system according to claim 26 wherein said control means further comprises a means for opening and closing said at least one switch means at least as fast as a half cycle of the AC input waveform.

28. The system according to claim 24 wherein said control means further comprises a means for selecting between a manual mode of operation and an automatic mode of operation.

29. The system according to claim 24 wherein said pulse width generation means further comprises:

means for determining the period of the AC power input;

means for dividing the period into equal time intervals;

means for generating a sampling reference signal; and means for comparing the sampling reference signal and the current error signal to determine pulse endpoints from intersection points of said signals.

30. The system according to claim 29 wherein said sampling reference signal has a triangle waveform.

31. The system according to claim 24 wherein said system further comprises means for phase-locking the inverter to the AC power input.

32. The system according to claim 24 wherein said means for determining a desired AC power output current further comprises a means for sensing the load current.

33. The system according to claim 24 wherein said means for determining a desired AC power output current further comprises a means for inputting a load current schedule.

34. An uninterruptible power supply system for delivering power to a load comprising:

input lines for receiving an AC power input having a waveform with positive and negative half cycles;

output lines for providing an AC power output to the load;

a battery capable of providing a DC output voltage;

a power transformer having a primary coupled to a secondary, the secondary being connected across the output lines;

an inverter connected to the primary of the power transformer and to the battery, including switching devices connected in a bridge configuration which are controllable to convert DC voltage power from the battery to AC voltage power at the primary of the power transformer and to supply the battery with power from the primary, the switching devices being responsive to control signals to switch between on and off states on a subcyclic basis; and control means, connected to the switching devices in the inverter, for controlling the power into and out of the inverter on a subcyclic basis relative to the AC power input, including:

means for sensing the battery voltage;

means for determining the polarity of the AC input;

means for determining a desired AC power output current;

means for generating a sinusoidal reference signal having an amplitude substantially equal to the desired output current;

means for comparing the sinusoidal reference signal with the output current to yield a current error signal; and means for generating a pulse having a width proportional to the amplitude of the current error signal for modulating the inverter switching devices;

wherein the switching devices are capable of assuming at least three configurations, including:

a first battery-connect configuration which enables current to flow between the battery and the primary when the AC input voltage is positive;

a second battery-connect configuration which enables current to flow between the battery and the primary when the AC input voltage is negative; and a battery-isolation configuration which enables current to flow between the switching devices and an effective inductance which includes the effective leakage inductance of the primary and the secondary of the transformer, while substantially preventing current flow between the battery and the switching devices;

wherein said control means is capable of configuring said switching devices between said first battery-connect configuration, said second battery-connect configuration and said battery-isolation configuration based upon the polarity of the AC input voltage and the error signal;

wherein said switches are modulated into one of said battery-connect configurations for a duration based on the pulse width, and otherwise configured into the battery-isolation configuration;

wherein the battery is capable of supplying power to the load through said inverter when the polarities of the AC input voltage and the error signal coincide;

wherein the effective inductance is capable of supplying power to the load through said inverter when the polarities of the AC input voltage and the error signal coincide;

wherein the AC power input is capable of charging the battery through the inverter means when the polarities of the AC input voltage and the error signal differ;

wherein the AC power input is capable of supplying power to the effective inductance by building up a current therein when the polarities of the AC input voltage and the error signal differ;

wherein said system is capable of supplying power to the load from the battery and the AC power input simultaneously; and wherein said system is capable of supplying power to the load in the absence of AC input power;

whereby the inverter is capable of operating in at least three modes, including:

a battery charging mode in which the AC input power is rectified and supplied to the battery;

an inverter mode in which the battery supplies AC power to the load; and a parallel mode in which the AC input power and the battery simultaneously supply AC power to the load.

35. The uninterruptible power supply system according to claim 34 wherein said control means is capable of configuring said switching devices according to an optimization strategy.

* * * * *